United States Patent
Pope et al.

(10) Patent No.: US 10,469,632 B2
(45) Date of Patent: *Nov. 5, 2019

(54) REDUCING NETWORK LATENCY

(71) Applicant: Solarflare Communications, Inc., Irvine, CA (US)

(72) Inventors: Steven Leslie Pope, Cambridge (GB); David James Riddoch, Fenstanton (GB); Kieran Mansley, Cambridge (GB)

(73) Assignee: Solarflare Communications, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/135,709

(22) Filed: Sep. 19, 2018

(65) Prior Publication Data

US 2019/0020740 A1 Jan. 17, 2019

Related U.S. Application Data

(63) Continuation of application No. 15/879,909, filed on Jan. 25, 2018, which is a continuation of application
(Continued)

(51) Int. Cl.
*H04L 29/06* (2006.01)
*H04L 29/08* (2006.01)
*H04L 12/859* (2013.01)

(52) U.S. Cl.
CPC ........... *H04L 69/22* (2013.01); *H04L 69/161* (2013.01); *H04L 69/166* (2013.01); *H04L 69/329* (2013.01); *H04L 47/2475* (2013.01)

(58) Field of Classification Search
CPC .............................. H04L 69/22; H04L 69/166
See application file for complete search history.

(56) References Cited

U.S. PATENT DOCUMENTS 4,905,234 A * 2/1990 Childress .................. H04L 1/08
370/349
5,272,599 A 12/1993 Koenen
(Continued)

FOREIGN PATENT DOCUMENTS

EP 620521 A2 10/1994
EP 2463782 A2 6/2012
(Continued)

OTHER PUBLICATIONS

Extended European Search Report for European Application No. 13153148.5 dated Feb. 19, 2014.
(Continued)

*Primary Examiner* — Arvin Eskandarnia
(74) *Attorney, Agent, or Firm* — Wolf, Greenfield & Sacks, P.C.

(57) ABSTRACT

A method of transmitting data for use at a data processing system and network interface device, the data processing system being coupled to a network by the network interface device, the method comprising: forming a message template in accordance with a predetermined set of network protocols, the message template including at least in part one or more protocol headers; forming an application layer message in one or more parts; updating the message template with the parts of the application layer message; processing the message template in accordance with the predetermined set of network protocols so as to complete the protocol headers; and causing the network interface device to transmit the completed message over the network.

17 Claims, 2 Drawing Sheets

Related U.S. Application Data

No. 15/253,822, filed on Aug. 31, 2016, now Pat. No. 10,021,223, which is a continuation of application No. 15/016,659, filed on Feb. 5, 2016, now Pat. No. 9,456,060, which is a continuation of application No. 13/283,420, filed on Oct. 27, 2011, now Pat. No. 9,258,390.

(60) Provisional application No. 61/513,108, filed on Jul. 29, 2011.

(56) References Cited

U.S. PATENT DOCUMENTS

| | | |
|---|---|---|
| 5,325,532 A | 6/1994 | Crosswy et al. |
| 5,612,950 A * | 3/1997 | Young ................. H04L 1/1803 370/276 |
| 5,937,169 A | 8/1999 | Connery et al. |
| 5,946,189 A | 8/1999 | Koenen et al. |
| 6,098,112 A | 8/2000 | Ishijima et al. |
| 6,160,554 A | 12/2000 | Krause |
| 6,173,333 B1 | 1/2001 | Jolitz et al. |
| 6,304,945 B1 | 10/2001 | Koenen |
| 6,349,035 B1 | 2/2002 | Koenen |
| 6,427,173 B1 | 7/2002 | Boucher et al. |
| 6,438,130 B1 | 8/2002 | Kagan et al. |
| 6,502,203 B2 | 12/2002 | Barron et al. |
| 6,530,007 B2 | 3/2003 | Olarig et al. |
| 6,591,302 B2 | 7/2003 | Boucher et al. |
| 6,594,787 B1 | 7/2003 | Chesson |
| 6,667,918 B2 | 12/2003 | Leader et al. |
| 6,718,392 B1 | 4/2004 | Krause |
| 6,728,743 B2 | 4/2004 | Shachar |
| 6,735,642 B2 | 5/2004 | Kagan et al. |
| 6,768,996 B1 | 7/2004 | Steffens et al. |
| 6,904,534 B2 | 6/2005 | Koenen |
| 6,907,042 B1 | 6/2005 | Oguchi |
| 6,950,961 B2 | 9/2005 | Krause et al. |
| 6,965,941 B2 | 11/2005 | Boucher et al. |
| 6,978,331 B1 | 12/2005 | Kagan et al. |
| 7,089,326 B2 | 8/2006 | Boucher et al. |
| 7,093,158 B2 | 8/2006 | Barron et al. |
| 7,099,275 B2 | 8/2006 | Sarkinen et al. |
| 7,103,626 B1 | 9/2006 | Recio et al. |
| 7,103,744 B2 | 9/2006 | Garcia et al. |
| 7,136,397 B2 | 11/2006 | Sharma |
| 7,143,412 B2 | 11/2006 | Koenen |
| 7,149,227 B2 | 12/2006 | Stoler et al. |
| 7,151,744 B2 | 12/2006 | Sarkinen et al. |
| 7,216,225 B2 | 5/2007 | Haviv et al. |
| 7,240,350 B1 | 7/2007 | Eberhard et al. |
| 7,245,627 B2 | 7/2007 | Goldenberg et al. |
| 7,254,237 B1 | 8/2007 | Jacobson et al. |
| 7,285,996 B2 | 10/2007 | Fiedler |
| 7,316,017 B1 | 1/2008 | Jacobson et al. |
| 7,346,702 B2 | 3/2008 | Haviv |
| 7,386,619 B1 | 6/2008 | Jacobson et al. |
| 7,403,535 B2 | 7/2008 | Modi et al. |
| 7,404,190 B2 | 7/2008 | Krause et al. |
| 7,451,456 B2 | 11/2008 | Andjelic |
| 7,502,826 B2 | 3/2009 | Barron et al. |
| 7,502,870 B1 | 3/2009 | Chu |
| 7,509,355 B2 | 3/2009 | Hanes et al. |
| 7,518,164 B2 | 4/2009 | Smelloy et al. |
| 7,551,614 B2 | 6/2009 | Teisberg et al. |
| 7,554,993 B2 | 6/2009 | Modi et al. |
| 7,573,967 B2 | 8/2009 | Fiedler |
| 7,580,415 B2 | 8/2009 | Hudson et al. |
| 7,580,495 B2 | 8/2009 | Fiedler |
| 7,617,376 B2 | 11/2009 | Chadalapaka et al. |
| 7,631,106 B2 | 12/2009 | Goldenberg et al. |
| 7,636,703 B2 | 12/2009 | Taylor |
| 7,650,386 B2 | 1/2010 | McMahan et al. |
| 7,653,754 B2 | 1/2010 | Kagan et al. |
| 7,688,838 B1 | 3/2010 | Aloni et al. |
| 7,688,853 B2 | 3/2010 | Santiago et al. |
| 7,702,629 B2 | 4/2010 | Cytron et al. |
| 7,725,556 B1 | 5/2010 | Schlansker et al. |
| 7,757,232 B2 | 7/2010 | Hilland et al. |
| 7,801,027 B2 | 9/2010 | Kagan et al. |
| 7,802,071 B2 | 9/2010 | Oved |
| 7,813,460 B2 | 10/2010 | Fiedler |
| 7,827,442 B2 | 11/2010 | Sharma et al. |
| 7,835,375 B2 | 11/2010 | Sarkinen et al. |
| 7,835,380 B1 | 11/2010 | Aloni et al. |
| 7,848,322 B2 | 12/2010 | Oved |
| 7,856,488 B2 | 12/2010 | Cripe et al. |
| 7,864,787 B2 | 1/2011 | Oved |
| 7,895,445 B1 | 2/2011 | Albanese et al. |
| 7,904,576 B2 | 3/2011 | Krause et al. |
| 7,921,178 B2 | 4/2011 | Haviv |
| 7,929,539 B2 | 4/2011 | Kagan et al. |
| 7,930,437 B2 | 4/2011 | Kagan et al. |
| 7,934,959 B2 | 5/2011 | Rephaeli et al. |
| 7,945,528 B2 | 5/2011 | Cytron et al. |
| 7,954,114 B2 | 5/2011 | Chamberlain et al. |
| 7,978,606 B2 | 7/2011 | Buskirk et al. |
| 8,000,336 B2 | 8/2011 | Harel |
| 8,156,101 B2 | 4/2012 | Indeck et al. |
| 8,286,193 B2 | 10/2012 | Pope et al. |
| 8,326,816 B2 | 12/2012 | Colle et al. |
| 8,332,285 B1 | 12/2012 | Barua et al. |
| 8,346,919 B1 | 1/2013 | Eirksson et al. |
| 8,996,644 B2 | 3/2015 | Pope |
| 9,003,053 B2 | 4/2015 | Pope et al. |
| 9,258,390 B2 | 2/2016 | Pope et al. |
| 9,456,060 B2 | 9/2016 | Pope et al. |
| 10,021,223 B2 | 7/2018 | Pope et al. |
| 2001/0036184 A1 | 11/2001 | Kinoshita et al. |
| 2001/0036196 A1 | 11/2001 | Blightman et al. |
| 2002/0059052 A1 | 5/2002 | Bloch et al. |
| 2002/0095519 A1 | 7/2002 | Philbrick et al. |
| 2002/0107971 A1 | 8/2002 | Bailey et al. |
| 2002/0112139 A1 | 8/2002 | Krause et al. |
| 2002/0129293 A1 | 9/2002 | Hutton et al. |
| 2002/0140985 A1 | 10/2002 | Hudson |
| 2002/0156784 A1 | 10/2002 | Hanes et al. |
| 2002/0174240 A1* | 11/2002 | Nason ................. H04L 29/06 709/230 |
| 2002/0198990 A1 | 12/2002 | Bradfield et al. |
| 2003/0007165 A1 | 1/2003 | Hudson |
| 2003/0033588 A1 | 2/2003 | Alexander |
| 2003/0058459 A1 | 3/2003 | Wu et al. |
| 2003/0063299 A1 | 4/2003 | Cowan et al. |
| 2003/0065856 A1 | 4/2003 | Kagan et al. |
| 2003/0081060 A1 | 5/2003 | Zeng et al. |
| 2003/0086300 A1 | 5/2003 | Noyes et al. |
| 2003/0140124 A1 | 7/2003 | Burns |
| 2003/0172330 A1 | 9/2003 | Barron et al. |
| 2003/0191786 A1 | 10/2003 | Matson et al. |
| 2003/0202043 A1 | 10/2003 | Zeng et al. |
| 2003/0214677 A1 | 11/2003 | Bhaskar et al. |
| 2004/0015502 A1 | 1/2004 | Alexander et al. |
| 2004/0071250 A1 | 4/2004 | Bunton et al. |
| 2004/0073716 A1 | 4/2004 | Boom et al. |
| 2004/0141642 A1 | 7/2004 | Zeng et al. |
| 2004/0156393 A1 | 8/2004 | Gupta et al. |
| 2004/0190533 A1 | 9/2004 | Modi et al. |
| 2004/0190538 A1 | 9/2004 | Bunton et al. |
| 2004/0190557 A1 | 9/2004 | Barron |
| 2004/0193734 A1 | 9/2004 | Barron et al. |
| 2004/0193825 A1 | 9/2004 | Garcia et al. |
| 2004/0210670 A1 | 10/2004 | Anerousis et al. |
| 2004/0210754 A1 | 10/2004 | Barron et al. |
| 2004/0240435 A1 | 12/2004 | Boucher et al. |
| 2004/0249881 A1 | 12/2004 | Jha et al. |
| 2004/0249998 A1 | 12/2004 | Rajagopalan et al. |
| 2004/0252685 A1 | 12/2004 | Kagan et al. |
| 2005/0008223 A1 | 1/2005 | Zeng et al. |
| 2005/0018221 A1 | 1/2005 | Zeng et al. |
| 2005/0021874 A1 | 1/2005 | Georgiou et al. |
| 2005/0038918 A1 | 2/2005 | Hilland et al. |
| 2005/0038941 A1 | 2/2005 | Chadalapaka et al. |
| 2005/0039171 A1 | 2/2005 | Avakian et al. |
| 2005/0039172 A1 | 2/2005 | Rees et al. |

(56) References Cited

U.S. PATENT DOCUMENTS

| | | |
|---|---|---|
| 2005/0039187 A1 | 2/2005 | Avakian et al. |
| 2005/0066333 A1 | 3/2005 | Krause et al. |
| 2005/0137964 A1 | 6/2005 | Nordlicht et al. |
| 2005/0172181 A1 | 8/2005 | Huliehel |
| 2005/0216597 A1 | 9/2005 | Shah et al. |
| 2005/0219278 A1 | 10/2005 | Hudson |
| 2005/0219314 A1 | 10/2005 | Donovan et al. |
| 2005/0231751 A1 | 10/2005 | Wu et al. |
| 2006/0026443 A1 | 2/2006 | McMahan et al. |
| 2006/0045098 A1 | 3/2006 | Krause |
| 2006/0075130 A1 | 4/2006 | Craft et al. |
| 2006/0126619 A1 | 6/2006 | Teisberg et al. |
| 2006/0165074 A1 | 7/2006 | Modi et al. |
| 2006/0187931 A1 | 8/2006 | Hwang |
| 2006/0193318 A1 | 8/2006 | Narasimhan et al. |
| 2006/0228637 A1 | 10/2006 | Jackson et al. |
| 2006/0248191 A1 | 11/2006 | Hudson et al. |
| 2007/0067497 A1 | 3/2007 | Craft et al. |
| 2007/0121596 A1 | 5/2007 | Kurapati et al. |
| 2007/0188351 A1 | 8/2007 | Brown et al. |
| 2007/0209069 A1* | 9/2007 | Saklikar ............. H04L 63/1433 726/14 |
| 2007/0220183 A1 | 9/2007 | Kagan et al. |
| 2007/0223385 A1 | 9/2007 | Berly et al. |
| 2007/0237327 A1 | 10/2007 | Taylor et al. |
| 2007/0260602 A1 | 11/2007 | Taylor |
| 2007/0277036 A1 | 11/2007 | Chamberlain et al. |
| 2008/0005776 A1 | 1/2008 | VerSteeg et al. |
| 2008/0008205 A1 | 1/2008 | Jung et al. |
| 2008/0024586 A1 | 1/2008 | Barron |
| 2008/0109526 A1 | 5/2008 | Subramanian et al. |
| 2008/0115216 A1 | 5/2008 | Barron et al. |
| 2008/0115217 A1 | 5/2008 | Barron et al. |
| 2008/0126509 A1 | 5/2008 | Subramanian et al. |
| 2008/0135774 A1 | 6/2008 | Hugers |
| 2008/0140574 A1 | 6/2008 | Boucher et al. |
| 2008/0147828 A1 | 6/2008 | Enstone et al. |
| 2008/0148400 A1 | 6/2008 | Barron et al. |
| 2008/0177890 A1 | 7/2008 | Krause et al. |
| 2008/0189373 A1 | 8/2008 | Ikonen et al. |
| 2008/0244060 A1 | 10/2008 | Cripe et al. |
| 2008/0301406 A1 | 12/2008 | Jacobson et al. |
| 2008/0304519 A1 | 12/2008 | Koenen et al. |
| 2009/0024758 A1 | 1/2009 | Levy-Abegnoli et al. |
| 2009/0060197 A1 | 3/2009 | Taylor et al. |
| 2009/0165003 A1 | 6/2009 | Jacobson et al. |
| 2009/0182683 A1 | 7/2009 | Taylor et al. |
| 2009/0183057 A1 | 7/2009 | Aizman |
| 2009/0201926 A1 | 8/2009 | Kagan et al. |
| 2009/0213856 A1 | 8/2009 | Paatela et al. |
| 2009/0268612 A1 | 10/2009 | Felderman et al. |
| 2009/0287628 A1 | 11/2009 | Indeck et al. |
| 2009/0302923 A1 | 12/2009 | Smeloy et al. |
| 2010/0012718 A1 | 1/2010 | Griswold et al. |
| 2010/0088437 A1 | 4/2010 | Zahavi |
| 2010/0128623 A1 | 5/2010 | Dunn et al. |
| 2010/0138840 A1 | 6/2010 | Kagan et al. |
| 2010/0169880 A1 | 7/2010 | Haviv et al. |
| 2010/0185719 A1 | 7/2010 | Howard |
| 2010/0188140 A1 | 7/2010 | Smeloy |
| 2010/0189206 A1 | 7/2010 | Kagan |
| 2010/0198850 A1 | 8/2010 | Cytron et al. |
| 2010/0199085 A1 | 8/2010 | Bansal |
| 2010/0265849 A1 | 10/2010 | Harel |
| 2010/0274876 A1 | 10/2010 | Kagan et al. |
| 2010/0296518 A1 | 11/2010 | Cardona et al. |
| 2011/0004457 A1 | 1/2011 | Haviv et al. |
| 2011/0010557 A1 | 1/2011 | Kagan et al. |
| 2011/0019574 A1 | 1/2011 | Malomsoky et al. |
| 2011/0029669 A1 | 2/2011 | Chuang et al. |
| 2011/0029847 A1 | 2/2011 | Goldenberg et al. |
| 2011/0040701 A1 | 2/2011 | Singla et al. |
| 2011/0044344 A1 | 2/2011 | Hudson et al. |
| 2011/0058571 A1 | 3/2011 | Bloch et al. |
| 2011/0083064 A1 | 4/2011 | Kagan et al. |
| 2011/0096668 A1 | 4/2011 | Bloch et al. |
| 2011/0113083 A1 | 5/2011 | Shahar |
| 2011/0116512 A1 | 5/2011 | Crupnicoff et al. |
| 2011/0119673 A1 | 5/2011 | Bloch et al. |
| 2011/0151896 A1 | 6/2011 | Goldman et al. |
| 2011/0173352 A1 | 7/2011 | Sela et al. |
| 2011/0178917 A1 | 7/2011 | Parsons et al. |
| 2011/0178918 A1 | 7/2011 | Parsons et al. |
| 2011/0178919 A1 | 7/2011 | Parsons et al. |
| 2011/0178957 A1 | 7/2011 | Parsons et al. |
| 2011/0179315 A1 | 7/2011 | Yang |
| 2011/0184844 A1 | 7/2011 | Parsons et al. |
| 2012/0089496 A1 | 4/2012 | Taylor et al. |
| 2012/0089497 A1 | 4/2012 | Taylor et al. |
| 2012/0095893 A1 | 4/2012 | Taylor et al. |
| 2012/0102245 A1 | 4/2012 | Gole et al. |
| 2012/0108230 A1 | 5/2012 | Stepanian |
| 2012/0136514 A1 | 5/2012 | Noffsinger et al. |
| 2012/0151004 A1 | 6/2012 | Pope |
| 2012/0246052 A1 | 9/2012 | Taylor et al. |
| 2013/0007000 A1 | 1/2013 | Indeck et al. |
| 2013/0031268 A1 | 1/2013 | Pope et al. |
| 2013/0080651 A1 | 3/2013 | Pope et al. |
| 2013/0145035 A1 | 6/2013 | Pope et al. |
| 2013/0312048 A1 | 11/2013 | Grossman |
| 2014/0105208 A1 | 4/2014 | Pope et al. |
| 2014/0279342 A1 | 9/2014 | Maynard |
| 2014/0310149 A1 | 10/2014 | Singh |
| 2014/0310405 A1 | 10/2014 | Pope et al. |
| 2015/0049763 A1 | 2/2015 | Michels et al. |
| 2015/0161064 A1 | 6/2015 | Pope |
| 2015/0169496 A1 | 6/2015 | Pope |
| 2016/0156749 A1 | 6/2016 | Pope et al. |
| 2016/0373561 A1 | 12/2016 | Pope et al. |
| 2018/0152546 A1 | 5/2018 | Pope et al. |

FOREIGN PATENT DOCUMENTS

| | | |
|---|---|---|
| WO | WO 00/10095 A1 | 2/2000 |
| WO | WO 01/48972 A1 | 7/2001 |
| WO | WO 02/35838 A1 | 5/2002 |
| WO | WO 2008/127672 A2 | 10/2008 |
| WO | WO 2009/134219 A1 | 11/2009 |
| WO | WO 2009/136933 A1 | 11/2009 |
| WO | WO 2010/020907 A2 | 2/2010 |
| WO | WO 2010/087826 A1 | 8/2010 |
| WO | WO 2011/043769 A1 | 4/2011 |
| WO | WO 2011/053305 A1 | 5/2011 |
| WO | WO 2011/053330 A1 | 5/2011 |

OTHER PUBLICATIONS

EP 12185546.4—Extended European Search Report dated Jul. 11, 2013, 6 pages.
EP 13153148.5-1953—Extended European Search Report dated Feb. 19, 2014, 6 pages.
EP 13187725.0-1953—Extended European Search Report dated Feb. 19, 2014, (6 pages).
Extended European Search Report for European Application No. 17167472.4 dated Jun. 30, 2017.
Extended European Search Report for European Application No. 17172686.2 dated Sep. 20, 2017.
U.S. Appl. No. 12/964,642—Office Action dated Feb. 12, 2014, 54 pages.
U.S. Appl. No. 12/964,642—Response to Office Action dated Feb. 12, 2014 filed Jul. 30, 2014, 16 pages.
U.S. Appl. No. 12/964,642—Notice of Allowance dated Nov. 26, 2014, 21 pages.
U.S. Appl. No. 13/283,420—Office Action dated Dec. 3, 2014, 66 pages.
U.S. Appl. No. 13/283,420—Resposne to Office Action dated Dec. 3, 2014 filed Apr. 7, 2015, 13 pages.
U.S. Appl. No. 13/283,420—Final Office Action dated Jul. 22, 2015, 12 pages.
U.S. Appl. No. 13/283,420—esponse to Final Office Action dated Jul. 22, 2015 filed Sep. 14, 2015, 16 pages.

(56) References Cited

OTHER PUBLICATIONS

U.S. Appl. No. 13/283,420—Notice of Allowance dated Oct. 2, 2015, 17 pages.
U.S. Appl. No. 13/624,788—Office Action dated Aug. 1, 2014, 66 pages.
U.S. Appl. No. 13/624,788—Response to Office Action dated Aug. 1, 2014 filed Oct. 29, 2014, 14 pages.
U.S. Appl. No. 13/624,788—Notice of Allowance dated Dec. 5, 2014, 12 pages.
U.S. Appl. No. 13/624,788—Notice of Allowance dated Dec. 5, 2014, 7 pages.
U.S. Appl. No. 13/671,434—Office Action dated Mar. 23, 2016, 73 pages.
US 13/671,434—Response to Mar. 23 Office Action filed Jul. 8, 2016, 18 pages.
US 13/671,434—Notice of Allowance dated Nov. 7, 2016, 8 pages.
U.S. Appl. No. 13/754,792—Office Action dated Dec. 18, 2015, 92 pages.
U.S. Appl. No. 13/789,353—Office Action dated Apr. 23, 2015, 89 pages.
U.S. Appl. No. 13/789,353—Response to Office Action dated Apr. 23, 2015 filed Jul. 13, 2015, 16 pages.
U.S. Appl. No. 13/789,353—Final Office Action dated Jul. 28, 2015, 36 pages.
U.S. Appl. No. 13/789,353—Response to Final Office Action dated Jul. 28, 2015, filed Sep. 25, 2015, 13 pages.
U.S. Appl. No. 13/789,353—Advisory Action dated Oct. 16, 2015, 4 pages.
U.S. Appl. No. 13/789,353—Response to Advisory Action and Final Office Action dated Oct. 16, 2015 filed Oct. 27, 2015, 14 pages.
U.S. Appl. No. 13/789,353—Office Action dated Jul. 7, 2016, 30 pages.
U.S. Appl. No. 13/789,353—Response to Jul. 7 Office Action filed Oct. 7, 2016, 17 pages.
U.S. Appl. No. 14/231,510—Office Action dated Mar. 24, 2016, 16 pages.
U.S. Appl. No. 14/231,510—Response to Mar. 24 Office Action filed Aug. 22, 2016, 14 pages.
U.S. Appl. No. 15/016,659—Notice of Allowance dated May 25, 2016, 20 pages.
"Exokernel—Structure and Architecture of MIT's Exokernel," 2000, 18 pages
"Introduction to the tuxgraphics TCP/IP stack, 3rd generation," generated Feb. 25, 2012, version 2.57< http://www.tuxgraphics.org/electronics/200905/embedded-tcp-ip-stack.shtml >, retrieved Aug. 30, 2016, 27 pages.
"Nvidia GPUDirect.TM. Technology—Accelerating GPU-based Systems," Mellanox Tech. Brief, May 2010, 2pp: <http://www.mellanox.com/pdf/whitepapers/TB_GPU_Direct.pdf>.
"NVIDIA Tesla GPUs to Communicate Faster Over Mellanox InfiniBand Networks," press release dated Nov. 25, 2009, Portland OR, 3 pp: <http://gpgpu.org/2009/11/25/nvidia-tesla-mellanox-infiniband>.
A Edwards, S. Muir; "Experiences Implementing a High-Performance TCP in User-Space," ACM Computer Communication Review, vol. 25, No. 4, pp. 196-205, Oct. 1995.
A. Edwards, et al.; "User-Space Protocols Deliver High Performance to Applications on a Low-Cost Gb/s LAN," ACM Computer Communication Review, vol. 24, No. 4, pp. 14-23, Oct. 1994.
A. Romanow and S. Floyd; "The Dynamics of TCP Traffic over ATM Networks," ACM Computer Communication Review, vol. 24, No. 4, pp. 79-88, Oct. 1994.
Andrew D. Birrell, et al.; "Grapevine: An Exercise in Distributed Computing," Communications of the ACM, vol. 25, Issue 4, pp. 260-274, Apr. 1982.
Andy Currid; "TCP Offload to the Rescue," ACM Queue, vol. 2, No. 3, pp. 58-65, May 1, 2004.
B. Leslie, et al.; "User-level device drivers: Achieved performance," J. Comput. Sci. & Technol., vol. 20, pp. 1-17, Sep. 2005.
Babak Falsafi, et al.; "Application-Specific Protocols for User-Level Shared Memory," Proceedings of the 1994 conference on Supercomputing, pp. 380-389, Washington D.C.; Nov. 14, 1994.
Bilic Hrvoye, et al.; "Deferred Segmentation for Wire-Speed Transmission of Large TCP Frames over Standard GbE Networks," Proceedings of the 9th Symposium on High Performance Interconnects, 5 pages, Aug. 22, 2001.
Bilic Hrvoye, et al.; "Presentation given at HOTI'01," 9th Symposium on High Performance Interconnects, 9 pages, Aug. 22, 2001.
Boon S. Ang, et al.; "StarT-Voyager: A Flexible Platform for Exploring Scalable SMP Issues," Proceedings of the 1998 ACM/IEEE conference on Supercomputing, Orlando, Florida, 19 pages, Nov. 7, 1998.
Bruce Lowekamp, et al.; "Topology Discovery for Large Ethernet Networks," ACM Computer Communication Review, vol. 31, No. 4, pp. 237-248, Oct. 2001.
Bruce S. Davie; "A Host-Network Interface Architecture for ATM," ACM Computer Communication Review, vol. 21, No. 1, pp. 307-315, Sep. 1991.
C. A. Thekkath, et al.; "Implementing Network Protocols at User Level," ACM Computer Communication Review, vol. 23, No. 4, pp. 64-132, Oct. 1993.
C. Brendan S. Traw, et al.; "A High-Performance Host Interface for ATM Networks," ACM Computer Communication Review, vol. 21, No. 4, pp. 317-325, Sep. 1991.
C. Kline; "Supercomputers on the Internet: A Case Study," ACM Computer Communication Review, vol. 17, No. 5, pp. 27-33, Aug. 1987.
C. Partridge, J. Hughes, J. Stone; "Performance of Checksums and CRCS over Real Data," ACM Computer Communication Review, vol. 25, No. 4, pp. 68-76, Oct. 1995.
C. Traw and J. Smith; "Hardware/Software organization of a high performance ATM host interface," IEEE Journal on Selected Areas in Communications, pp. 1-22, Feb. 1993.
Charles Kalmanek; "A Retrospective View of ATM," ACM Computer Communication Review, vol. 32, No. 5, pp. 13-19, Nov. 2002.
Charles P. Thacker and Lawrence C. Stewart; "Firefly: a Multiprocessor Workstation," ACM Operating Systems Review, vol. 21, Issue 4, pp. 164-172, Oct. 1987.
Cheng Jin, et al.; "FAST TCP: Motivation, Architecture, Algorithms, Performance," Proceedings of IEEE Infocom 2004, 21 pages, Mar. 7, 2004.
Chi-Chao Chang, et al.; "Low-Latency Communication on the IBM RISC System/6000 SP," Proceedings of the 1996 ACM/IEEE conference on Supercomputing, Pittsburgh, pp. 1-17, Nov. 17, 1996.
Chiou, Derek; Ang, Boon S., et al., "StarT-Voyager: A Flexible Platform for Exploring Scalable SMP Issues," Proc. 1998 ACM/IEEE conference on Supercomputing, Orlando, Florida, Nov. 7, 1998, 20pp.
Chris Maeda, Brian Bershad; "Protocol Service Decomposition for High-Performance Networking," ACM Operating Systems Review, vol. 27, Issue 5, 12 pages, Dec. 1993.
Christopher A. Kent, Jeffrey C. Mogul; "Fragmentation Considered Harmful," ACM Computer Communication Review, vol. 17, No. 5, pp. 75-87, Oct. 1987.
Craig Partridge; "How Slow is One Gigabit Per Second ?," ACM Computer Communication Review, vol. 20, No. 1, pp. 14-53, Jan. 1990.
D. Clark and D.L. Tennenhouse; "Architectural Considerations for a New Generation of Protocols," ACM Computer Communication Review, vol. 20, No. 4, pp. 200-208, Sep. 1990.
D. L. Tennenhouse, D. J. Wetherall; "Towards an Active Network Architecture," ACM Computer Communication Review, vol. 26, No. 2, pp. 5-18, Apr. 1996.
Danny Cohen, et al.; "Use of message-based multicomputer components to construct gigabit networks," ACM Computer Communication Review, vol. 23, No. 4, p. 32-44, Jul. 1993.
Danny Cohen, Gregory Finn, Robert Felderman, Annette DeSchon; "ATOMIC: A High-Speed Local Communication Architecture," Journal of High Speed Networks; pp. 1-11, Jan. 3, 1994.
Danny Cohen, Gregory Finn, Robert Felderman, Annette DeSchon; "ATOMIC: A Local Communication Network Created Through (56) References Cited

OTHER PUBLICATIONS

Repeated Application of Multicomputing Components," Provided by Authors, pp. 1-21, Jan. 10, 1992.
David A. Borman; "Implementing TCP/IP on a Cray computer," ACM Computer Communication Review, vol. 19, No. 2, pp. 11-15, Apr. 1989.
David D. Clark, et al.; "An Analysis of TCP Processing Overhead," IEEE Communications Magazine, vol. 27, No. 6, pp. 23-29, Jun. 1989.
David D. Clark; "The Design Philosophy of the DARPA Internet Protocols," ACM Computer Communication Review, vol. 18, No. 4, pp. 102-111, Aug. 1988.
David R. Boggs, et al.; "Measured Capacity of an Ethernet: Myths and Reality," ACM Computer Communication Review, vol. 18, No. 4, pp. 222-234, Aug. 1988.
David R. Cheriton; "Sirpent: A High-Performance Internetworking Approach," ACM Computer Communication Review, vol. 19, No. 4, pp. 158-169, Sep. 1989.
David Wetherall; "10 Networking Papers: Readings for Protocol Design," ACM Computer Communication Review, vol. 36, No. 3, pp. 77-78, Jul. 2006.
Declaration of Kevin Jeffay, Ph.D. Ex. 1001. Sep. 15, 2016. 66 pages.
Derek McAuley, Rolf Neugebauer; "A case for Virtual Channel Processors," Proceedings of the ACM SIGCOMM 2003 Workshops, pp. 237-242, Aug. 2003.
Derek Robert McAuley; "Protocol Design for High Speed Networks," PhD Thesis, University of Cambridge, 104 pages, Sep. 1989.
Dickman, L., "Protocol OffLoading vs OnLoading in High Performance Networks," 14th Symposium on High Performance Interconnects, Aug. 23, 2006, 8pp.
Druschel et al., "Lazy Receiver Processing (LRP): A Network Subsytem Architecture for Server Systems," 1996, Department of Computer Science, Rice University, 15 pages.
Druschel, Operating System Support for High-Speed Communication. Techniques to eliminate processing bottlenecks in high-speed networking are presented. Communications of the ACM. 1996;39(9):41-51.
E. Blanton and M. Allman; "On Making TCP More Robust to Packet Reordering," ACM Computer Communication Review, vol. 32, No. 1, pp. 20-30, Jan. 2002.
E. Ruetsche; "The Architecture of Gb/s Multimedia Protocol Adapter," ACM Computer Communication Review, vol. 23, No. 3, pp. 59-68, Jul. 1993.
Ed Anderson, et al.; "Performance of the CRAY T3E Multiprocessor," Proceedings of the 1997 ACM/IEEE conference on Supercomputing, pp. 1-17, San Jose, California; Nov. 16, 1997.
Edward D. Lazowska, David A. Patterson; "Computing Research: A Looming Crisis," ACM Computer Communication Review, vol. 35, No. 2, 2005, pp. 65-68, Jul. 2005.
Engler et al., "DPF: Fast, Flexible Message Demultiplexing using Dynamic Code Generation," 1996, M.I.T. Laboratory for Computer Science Cambridge, MA 02139, U.S.A., pp. 1-7.
Engler et al., "Exokemel: An Operating System Architecture for Application-Level Resource Management," 1995, M.I.T. Laboratory for Computer Science Cambridge, MA 02139, U.S.A, pp. 1-16.
Engler et al., "Exokernels MIT Lab for Computer Science slides," 1998,<https://pdos.csail.mit.edu/archive/exo/exo-slides/sld011.htm>- , 45 pages, slide 11 in particular.
Eric C. Cooper, et al.; "Protocol Implementation on the Nectar Communication Processor," ACM Computer Communication Review, vol. 20, No. 4, 10 pages, Sep. 1990.
Erich Ruetsche and Matthias Kaiserswerth; "TCP/IP on the Parallel Protocol Engine," Proceedings of the IFIP TC6/WG6.4 Fourth International Conference on High Performance Networking IV; pp. 119-134. Dec. 14, 1992.
F.F. Kuo; "The Aloha System," ACM Computer Communication Review, vol. 4, No. 1, pp. 5-8, Jan. 1974.
Ganger et al., "Fast and Flexible Application-Level Networking on Exokemel Systems," Feb. 2002, ACM Transactions on Computer Systems, vol. 20(1), pp. 49-83.
Gary S. Delp, et al.; "An Analysis of Memnet: An Experiment in High-Speed Shared-Memory Local Networking," ACM Computer Communication Review, vol. 18, No. 4, p. 165-174, Aug. 1988.
Gene Tsudik; "Message Authentication with One-Way Hash Functions," ACM Computer Communication Review, vol. 22, No. 5, pp. 29-38, Oct. 1992.
Geoffray, P., "Protocol off-loading vs on-loading in high-performance networks," 14th Symposium on High Performance Interconnects, Aug. 23, 2006, 5pp.
Gordon E. Moore; "Cramming more components onto integrated circuits," Electronics, vol. 38, No. 8, 4 pages, Apr. 1, 1965.
Greg Chesson; "The Evolution of XTP," Proceedings of the Third International Conference on High Speed Networking, pp. 1-10, Nov. 1991.
Greg Minshall, et al.; "Flow labelled IP over ATM: design and rationale ," ACM Computer Communication Review, vol. 36, No. 3, pp. 79-92, Jul. 2006.
Greg Regnier, et al.; "TCP Onloading for Data Center Servers," Computer, IEEE Computer Society, vol. 37, No. 11, pp. 18-58, Nov. 2004.
Greg Regnier, et al.; ETA: Experience with an Intel Xeon Processor as a Packet Processing EngineIEEE Micro, vol. 24, No. 1, pp. 24-31, Jan. 1994.
Gregory G. Finn and Paul Mockapetris; "Netstation Architecture Multi-Gigabit Workstation Network Fabric," Proceedings of InterOp '94, Las Vegas, Nevada; pp. 1-9, May 1994.
Gregory G. Finn; "An Integration of Network Communication with Workstation Architecture," ACM Computer Communication Review, vol. 21, No. 5, 12 pages, Oct. 1991.
Gregory L. Chesson; "Declaration of Dr Gregory L Chesson in *Alacritech* v. *Microsoft*," United States District Court, Northern District California, San Francisco Division, 289 pages, Feb. 4, 2005.
H. K. Jerry Chu; "Zero-Copy TCP in Solaris," Proceedings of the USENIX Annual Technical Conference, 13 pages, Jan. 1996.
H. Kanakia and D. Cheriton; "The VMP Network Adapter Board (NAB): High-Performance Network Communication for Multiprocessors," ACM Computer Communication Review, vol. 18, No. 4, pp. 175-187, Aug. 1988.
Harvey J. Wassermann, et al.; "Performance Evaluation of the SGI Origin2000: A Memory-Centric Characterization of LANL ASCI Applications," Proceedings of the 1997 ACM/IEEE conference on Supercomputing, pp. 1-11, San Jose, California; Nov. 16, 1997.
Hodges, S.J. et al., "Remoting Peripherals using Memory-Mapped Networks," Olivetti and Oracle Research Laboratory, Cambridge Univ., 1998, 3 pp: <http://www.cl.cam.ac.uk/research/dtg/www/publications/public/files/tr- .98.6.pdf>.
Humaira Kamal, et al.; "SCTP versus TCP for MPI," Proceedings of the 2005 ACM/IEEE conference on Supercomputing, Seattle, Washington, 14 pages, Nov. 12, 2005.
Ian Leslie and Derek R. McAuley; "Fairisle: An ATM Network for the Local Area," ACM Computer Communication Review, vol. 21, No. 4, pp. 327-336, Sep. 1991.
Ian M. Leslie, et al.; "The Architecture of the Universe Network," ACM Computer Communication Review, vol. 14, No. 2, pp. 2-9, Jun. 1984.
Ian Pratt and Keir Fraser; "Arsenic: A User-Accessible Gigabit Ethernet Interface," Proceedings of IEEE Infocom 2001, pp. 1-11; Apr. 22, 2001.
J. C. Mogul; "The Case for Persistent-Connection HTTP," ACM Computer Communication Review, vol. 25, No. 4, pp. 299-313, Oct. 1995.
J. Carver Hill; "Synchronizing Processors with Memory-Content-Generated Interrupts," Communications of the ACM, vol. 16, No. 6, p. 350-351, Jun. 1973.
J. Evans and T. Buller; "The End of History," IEEE TCGN Gigabit Networking Workshop, 10 pages, Apr. 22, 2001.
J. Vis; "A Simple LAN Performance Measure," ACM Computer Communication Review, vol. 24, No. 1, pp. 7-11, Jan. 1994.

(56) References Cited

OTHER PUBLICATIONS

Jack B. Dennis and Earl C. Van Horn; "Programming Semantics for Multiprogrammed Computations," Communications of the ACM, vol. 9, No. 3, pp. 143-155, Mar. 1966.
Jeffrey C. Mogul; "TCP offload is a dumb idea whose time has come," Proceedings of HotOS IX: The 9th Workshop on Hot Topics in Operating Systems, pp. 26-30, May 18, 2003.
Jeffrey R. Michel; "The Design and Evaluation of an Off-Host Communications Protocol Architecture," MSci Thesis, University of Virginia, 144 pages, Aug. 1993.
Jenwei Hsieh, et al.; "Architectural and Performance Evaluation of GigaNet and Myrinet Interconnects on Clusters of Small-Scale SMP Servers," Proceedings of the 2000 ACM/IEEE conference on Supercomputing, Dallas, Texas, pp. 1-9, Nov. 4, 2000.
Jiuxing Liu, et al.; "Performance Comparison of MPI Implementations over InfiniBand, Myrinet and Quadrics," Proceedings of the 2003 ACM/IEEE conference on Supercomputing, Phoenix, Arizona, pp. 1-15, Nov. 15, 2003.
Joe Touch, et al.; "Experiences with a Production Gigabit LAN," Gigabit Networking Workshop '97 Meeting, Kobe, Japan, 10 pages, Apr. 1997.
Joe Touch, et al.; "Host-based Routing Using Peer DMA," Gigabit Networking Workshop '97 Meeting, Kobe, Japan, 2 pages, Apr. 1997.
John M McQuillan, et al.; "An Overview of the New Routing Algorithm for the ARPANET," Proceedings of the 6th Data Communications Symposium, pp. 54-60, Nov. 1979.
John Nagle; "Congestion Control in IP/TCP Internetworks," ACM Computer Communication Review, vol. 14, No. 4, p. 11-17, Oct. 1984.
John Salmon, et al.; "Scaling of Beowulf-class Distributed Systems," Proceedings of the 1998 ACM/IEEE Conference on Supercomputing, Orlando, Florida, pp. 1-18, Nov. 7, 1998.
Johnson et al., "The Peregrine High-Performance RPC System—Software—Practice and Experience," Feb. 1993, vol. 23(2), pp. 201-221.
Jon Crowcroft, Derek McAuley; "ATM: A Retrospective on Systems Legacy," ACM Computer Communication Review, vol. 32, No. 5, pp. 11-21, Nov. 2002.
Jon Crowcroft; "10 Networking Papers: Recommended Reading," ACM Computer Communication Review, vol. 36, No. 2, pp. 31-32, Apr. 2006.
Jonathan Kay and Joseph Pasquale; "The Importance of Non-Data Touching Processing Overheads in TCP/IP," ACM Computer Communication Review, vol. 23, No. 4, 10 pages, Oct. 1993.
Jonathan M. Smith and C. Brendan S. Traw; "Giving Applications Access to Gb/s Networking," IEEE Network, vol. 7, Issue 4, 14 pages, Jul. 1993.
Jonathan Smith; "The Influence of ATM on Operating Systems," ACM Computer Communication Review, vol. 32, No. 5, pp. 29-37, Nov. 2002.
Jonathan Stone, Craig Partridge; "When the CRC and TCP Checksum Disagree," ACM Computer Communication Review, vol. 30, No. 4, 11 pages, Oct. 2000.
Jose Carlos Sancho, et al.; "Quantifying the Potential Benefit of Overlapping Communication and Computation in Large-Scale Scientific Applications," Proceedings of the 2006 ACM/IEEE conference on Supercomputing, Tampa, Florida, 40 pages, Nov. 11, 2006.
Justin Hurwitz, Wu-chun Feng; "Initial End-to-End Performance Evaluation of 10-Gigabit Ethernet," Proceedings of the 11th Symposium on High Performance Interconnects, 6 pages, Aug. 20, 2003.
Kleinpaste, P. Steenkiste, B. Zill; "Software Support for Outboard Buffering and Checksumming," ACM Computer Communication Review, vol. 25, No. 4, pp. 87-98, Oct. 1995.
Kaashoek et al., "Application Performance and Flexibility on Exokernel Systems," <www2.cs.uh.edu/.about.paris/6360/PowerPoint/Xok. ppt> retreived Aug. 30, 2016, 23 pages, slide 10 in particular.
Kaashoek et al., "Application Performance and Flexibility on Exokernel Systems," 1995, M.I.T. Laboratory for COmputer Science, Cambridge, MA 02139, U.S.A, pp. 1-14.
Ken Calvert; "Reflections on Network Architecture: an Active Networking Perspective," ACM Computer Communication Review, vol. 36, No. 2, pp. 27-30, Apr. 2006.
Kieran Mansley, et al.; "Getting 10 Gb/s from Xen," Euro-Par Conference 2007, Rennes, France, 10 pages, Aug. 28, 2007.
Kurose et al., Computer Networking. A Top-Down Approach Featuring the Internet. Third edition. 2005. 51 pages.
L. S. Brakmo, et al.; "TCP Vegas: New Techniques for Congestion Detection and Avoidance," ACM Computer Communication Review, vol. 24, No. 4, pp. 24-35, Oct. 1994.
M Kaiserswerth; "The Parallel Protocol Engine," IEEE/ACM Transactions in Networking vol. 1, Issue 6, pp. 650-663, Dec. 1993.
M. Allman; "TCP Byte Counting Refinements," ACM Computer Communication Review, vol. 29, No. 3, pp. 14-22, Jul. 1999.
M. de Vivo, et al.; "Internet Vulnerabilities Related to TCP/IP and T/TCP," ACM Computer Communication Review, vol. 29, No. 1, pp. 81-85, Jan. 1999.
M.V. Wilkes and R.M. Needham; "The Cambridge Model Distributed System," ACM SIGOPS Operating Systems Review, vol. 14, Issue 1, pp. 21-29, Jan. 1980.
Mansley, Engineering a User-Level TCP for the CLAN Network. Position Paper. 2003. 9 pages.
Maquelin et al., Polling Watchdog: Combining Polling and Interrupts for Efficient Message Handling. ISCA 1996;24(2):179-88.
Margaret L. Simmons and Harvey J. Wasserman; "Performance Comparison of the Cray-2 and Cray X-MP/416 Supercomputers," Proceedings of the 1988 ACM/IEEE conference on Supercomputing, pp. 288-295, Orlando, Florida; Nov. 12, 1988.
Mark David Hayter; "A Workstation Architecture to Support Multimedia," PhD Thesis, University of Cambridge, 111 pages, Sep. 1993.
Mark Hayter, Derek McAuley; "The Desk Area Network," ACM Operating Systems Review, vol. 25, Issue 4, pp. 1-11, Oct. 1991.
Marvin Zelkowitz; "Interrupt Driven Programming," Communications of the ACM, vol. 14, No. 6, p. 417-418, Jun. 1971.
Mengjou Lin, et al.; "Performance of High-Speed Network I/O Subsystems: Case Study of a Fibre Channel Network," Proceedings of the 1994 conference on Supercomputing, Washington D.C.; pp. 174-183, Nov. 14, 1994.
Michael J. Dixon; "System support for multi-service traffic," University of Cambridge Computer Laboratory Technical Report, No. 245, pp. 1-108, Jan. 1992.
Michael S. Warren, et al.; "Avalon: An Alpha/Linux Cluster Achieves 10 Gflops for $150k," Proceedings of the 1998 ACM/IEEE conference on Supercomputing, Orlando, Florida, pp. 1-10, Nov. 7, 1998.
Mogl,., "TCP offload is a dumb idea whose time has come," USENIX Assoc., Proceedings of HotOS IX: The 9th Workshop on Hot Topics in Operating Systems, May 2003, pp. 24-30.
Montry G., OpenFabrics Alliance presentation slides, 14th Symposium on High Performance Interconnects, Aug. 23, 2006, 8pp.
Murali Rangarajan, et al.; "TCP Servers: Offloading TCP Processing in Internet Servers. Design, Implementation, and Performance," Technical Report DCR-TR-481, Computer Science Department, Rutgers University, 14 pages, Mar. 2002.
Nanette J. Boden, et al.; "Myrinet: A Gigabit-per-Second Local-Area Network," Draft of paper published in IEEE Micro, vol. 15, No. 1, pp. 1-15, Nov. 16, 1994.
NR Adiga, et al.; "An Overview of the BlueGene/L Supercomputer," Proceedings of the 2002 ACM/IEEE conference on Supercomputing, pp. 1-22, Baltimore; Nov. 16, 2002.
O. Angin, et al.; "Report on the 5th IFIP Internation Workshop on Quality of Service (IWQOS 97)," ACM Computer Communication Review, vol. 27, No. 3, pp. 100-117, Jul. 1997.
P. Balaji, et al.; "Head-to-Toe Evaluation of High-Performance Sockets Over Protocol Offload Engines," Proceedings of the IEEE International Conference on Cluster Computing, 2005, pp. 1-10, Sep. 2005.
P. Druschel, et al.; "Experiences with a High-Speed Network Adaptor: A Software Perspective," ACM Computer Communication Review, vol. 24, No. 4, pp. 2-13, Oct. 1994.
P. Kermani and L Kleinrock; "Virtual cut-through: A new computer communciation switching technique," Computer Networks, vol. 3, No. 4, pp. 267-286, Sep. 1979.

(56) References Cited

OTHER PUBLICATIONS

Parry Husbands and James C. Hoe; "MPI-StarT: Delivering Network Performance to Numerical Applications," Proceedings of the 1998 ACM/IEEE conference on Supercomputing, Orlando, Florida, 15 pages, Nov. 7, 1998.
Pasi Sarolahti, et al.; "F-RTO: An Enhanced Recovery Algorithm for TCP Retransmission Timeouts," ACM Computer Communication Review, vol. 33, No. 2, pp. 51-63, Apr. 2003.
Patrick Crowley, et al.; "Characterizing Processor Architectures for Programmable Network Interfaces," Proceedings of the 14th international conference on Supercomputing, Santa Fe, New Mexico, 12 pages, May 8, 2000.
Patrick Geoffray; "A Critique of RDMA," HPCWire article: http://www.hpcwire.com/features/17886984.html, 7 pages, Aug. 18, 2006.
Paul E. McKenney and Ken F. Dove; "Efficient Demultiplexing of Incoming TCP Packets," ACM Computer Communication Review, vol. 22, No. 4, pp. 269-279, Oct. 1992.
Paul Ronald Barham; "Devices in a Multi-Service Operating System," PhD Thesis, University of Cambridge, 142 pages, Jul. 1996.
Paul V. Mockapetris, Kevin J. Dunlap; "Development of the Domain Name System," ACM Computer Communication Review, vol. 18, No. 4, pp. 112-122, Aug. 1988.
Perlman, Interconnections Second Edition. Bridges, Routers, Switches, and Internetworking Protocols. Addison-Wesley. 2000, 21 pages.
Peter Druschel and Larry L. Peterson; "Fbufs: A High-Bandwidth Cross-Domain Transfer Facility," ACM Operating Systems Review, vol. 27, Issue 5, pp. 189-202, Dec. 1993.
Peter Steenkiste; "Analyzing Communication Latency using the Nectar Communication Processor," ACM Computer Communication Review, vol. 22, No. 4, pp. 199-209, Oct. 1992.
Petrini, F., "Protocol Off-loading vs On-loading in High-Performance Networks," 14th Symposium on High Performance Interconnects, Aug. 23, 2006, 4pp.
Philip Buonadonna, et al.; "An Implementation and Analysis of the Virtual Interface Architecture," Proceedings of the 1998 ACM/IEEE conference on Supercomputing, Orlando, Florida, 20 pages, Nov. 7, 1998.
Piyush Shivam, et al.; "EMP: Zero-copy OS-bypass NIC-driven Gigabit Ethernet Message Passing," Proceedings of be 2001 ACM/IEEE conference on Supercomputing, Denver, CO, pp. 1-8, Nov. 10, 2001.
Pope, S.L. et al., "Enhancing Distributed Systems with Low-Latency Networking," Olivetti and Oracle Research Laboratory, Cambridge Univ. May 1998, 12 pp: <http://www.cl.cam.ac.uk/research/dtg/www/publications/public/files/tr-.98.7.pdf>.
R. Braden, et al.; "Computing the Internet Checksum," ACM Computer Communication Review, vol. 19, No. 2, pp. 86-94, Apr. 1989.
R. Bush, D. Meyer; "Some Internet Architectural Guidelines and Philosophy," IETF Network Working Group, Request for Comments: 3439, pp. 1-25, Dec. 2002.
R. J. Black, I. Leslie, and D. McAuley; "Experiences of Building an ATM Switch for the Local Area," ACM Computer Communication Review, vol. 24, No. 4, pp. 158-167, Oct. 1994.
Raj K. Singh, et al.; "A Programmable HIPPI Interface for a Graphics Supercomputer," Proceedings of the 1993 ACM/IEEE conference on Supercomputing, pp. 124-132, Portland, Oregon; Nov. 15, 1993.
Raj K. Singh, et al.; "A Programmable Network Interface for a Message-Based Multicomputer," ACM Computer Communication Review, vol. 24, No. 3, pp. 8-17, Jul. 1994.
Regnier G., "Protocol Onload vs. Offload," 14th Symposium on High Performance Interconnects, Aug. 23, 2006, 1pp.
Riddoch et al., Distributed Computing with the CLAN Network Proceedings of the 27.sup.th Annual IEEE Conference on Local Computer Networks. 2002. 10 pages.
Robert M. Brandriff, et al.; "Development of a TCP/IP for the IBM/370," ACM Computer Communication Review, vol. 15, No. 4, pp. 2-8, Sep. 1985.
Robert M. Metcalfe and David R. Boggs; "Ethernet: distributed packet switching for local computer networks," Communications of the ACM, vol. 19, Issue 7, pp. 395-404, Jul. 1976.
Robert Ross, et al.; "A Case Study in Application I/O on Linux Clusters," Proceedings of the 2001 ACM/IEEE conference on Supercomputing, Denver, CO, 17 pages, Nov. 10, 2001.
S. L. Pope, et al.; "Enhancing Distributed Systems with Low-Latency Networking," Parallel and Distributed Computing and Networks, Brisbane, Australia, pp. 1-12, Dec. 1998.
Sally Floyd; "TCP and Explicit Congestion Notification," ACM Computer Communication Review, vol. 24, No. 5, p. 8-23, Oct. 1994.
Sayantan Sur, et al.; "High-Performance and Scalable MPI over InfiniBand with Reduced Memory Usage: An In-Depth Performance Analysis," Proceedings of the 2006 ACM/IEEE conference on Supercomputing, Tampa, Florida, 13 pages, Nov. 11, 2006.
Srihari Makineni and Ravi Iyer; "Architectural Characterization of TCP/IP Packet Processing on the Pentium M Processor," Proceedings of the 10th International Symposium on High Performance Computer Architecture, 11 pages, Feb. 14, 2004.
Steve Muir and Jonathan Smith; "Piglet: A Low-Intrusion Vertical Operating System," Technical Report MS-CIS-00-04, University of Pennsylvania, 2000, pp. 1-15, Jan. 2000.
Steven J. Sistare, Christopher J. Jackson; "Ultra-High Performance Communication with MPI and the Sun Fire Link Interconnect," Proceedings of the 2002 ACM/IEEE conference on Supercomputing, p. 1-15, Baltimore; Nov. 16, 2002.
Steven Pope, David Riddoch; "10Gb/s Ethernet Performance and Retrospective," ACM Computer Communication Review, vol. 37, No. 2, pp. 89-92, Mar. 19, 2007.
Stuart Wray, et al.; "The Medusa Applications Environment," Proceedings of the International Conference on Multimedia Computing and Systems, Boston, MA, 9 pages, May 1994.
Sumitha Bhandarkar, et al.; "LTCP: Improving the Performance of TCP in Highspeed Networks," ACM Computer Communication Review, vol. 36, No. 1, pp. 41-50, Jan. 2006.
Tanenbaum, Computer Networks. Fourth Edition. 2002. 19 pages.
Thomas Sterling, et al.; "Beowolf: A Parallel Workstation for Scientific Computation," Proceedings of the 24th International Conference on Parallel Processing, pp. 1-4, Aug. 1995.
Thorsten von Eicken, et al.; "U-Net: A User-Level Network Interface for Parallel and Distributed Computing," ACM Operating Systems Review, vol. 29, Issue 5, pp. 40-53, Dec. 1995.
Tom Kelly; "Scalable TCP: Improving Performance in Highspeed Wide Area Networks," ACM Computer Communication Review, vol. 33, No. 2, pp. 83-91, Apr. 2003.
V. Cerf, et al.; "Proposal for an International End-to-End Protocol," ACM Computer Communication Review, vol. 6 No. 1, pp. 63-89, Jan. 1976.
V. Jacobson; "Congestion Avoidance and Control," ACM Computer Communication Review, vol. 18, No. 4, pp. 157-173, Aug. 1988.
Various forum members; "MPI: A Message-Passing Interface Standard," Message-Passing Interface Forum, University of Tennessee, Knoxville, 236 pages, May 5, 1994.
Various; "Various presentations given at HOTI'06," 14th Symposium on High Performance Interconnects; Aug. 23, 2006.
Vinay Aggarwal, et al.; "Workshop on network-I/O convergence: experience, lessons, implications (NICELI)," ACM Computer Communication Review, vol. 33, No. 5, pp. 75-80, Oct. 2003.
Vinton Cerf, Robert Kahn; "A Protocol for Packet Network Intercommunication," IEEE Transactions on Communications, vol. COM-22, No. 5, 13 pages, May 1974.
W. E. Leland, et al.; "On the Self-Similar Nature of Ethernet Traffic," ACM Computer Communication Review, vol. 23, No. 4, pp. 183-193, Oct. 1993.
W. Feng and P. Tinnakornsrisuphap; "The Failure of TCP in High-Performance Computational Grids," Proceedings of the 2000 ACM/IEEE conference on Supercomputing, Dallas, Texas, 11 pages, Nov. 4, 2000.
W. Feng, et al.; "Performance Characterization of a 10-Gigabit Ethernet TOE," Proceedings of the 13th Symposium on High Performance Interconnects, pp. 1-6, Aug. 17, 2005.

(56) References Cited

OTHER PUBLICATIONS

Wilda, "Raw/TCP," lwIP—lightweight TCP/IP last changed Jun. 16, 2011,<http://lwip.wikia.com/wiki/Raw/TCP> retrieved Aug. 30, 2016, 6 pages.
Wikipedia, "TUX web server," last modified Aug. 30, 2015, <https://en.wikipedia.org/wiki/TUX_web_server>, retreived Aug. 30, 2016, 2 pages.
Wu-chun Feng, et al.; "Optimizing 10-Gigabit Ethernet for Networks of Workstations, Clusters, and Grids: A Case Study," Proceedings of the 2003 ACM/IEEE conference on Supercomputing, Phoenix, Arizona, 13 pages, Nov. 15, 2003.
EP 12185546.4, Jul. 11, 2013, Extended European Search Report.
EP 13153148.5, Feb. 19, 2014, Extended European Search Report.
EP 13187725.0, Feb. 19, 2014, Extended European Search Report.
EP 17167472.4, Jun. 30, 2017, Extended European Search Report.
EP 17172686.2, Sep. 20, 2017, Extended European Search Report.
U.S. Appl. No. 12/964,642, Feb. 12, 2014, Office Action.
U.S. Appl. No. 12/964,642, Jul. 30, 2014, Response to Office Action dated Feb. 12, 2014.
U.S. Appl. No. 12/964,642, Nov. 26, 2014, Notice of Allowance.
U.S. Appl. No. 13/283,420, Dec. 3, 2014, Office Action.
U.S. Appl. No. 13/283,420, Apr. 7, 2015, Response to Office Action dated Dec. 3, 2014.
U.S. Appl. No. 13/283,420, Jul. 22, 2015, Final Office Action.
U.S. Appl. No. 13/283,420, Sep. 14, 2014, Response to Final Office Action dated Jul. 22, 2015.
U.S. Appl. No. 13/283,420, Oct. 2, 2015, Notice of Allowance.
U.S. Appl. No. 13/624,788, Aug. 1, 2014, Office Action.
U.S. Appl. No. 13/624,788, Oct. 29, 2014, Response to Office Action dated Aug. 1, 2014.
U.S. Appl. No. 13/624,788, Dec. 5, 2014, Notice of Allowance.
U.S. Appl. No. 13/671,434, Mar. 23, 2016, Office Action.
U.S. Appl. No. 13/671,434, Jul. 8, 2016, Response to Office Action dated Mar. 23, 2016.
U.S. Appl. No. 13/671,434, Nov. 7, 2016, Notice of Allowance.
U.S. Appl. No. 13/754,792, Dec. 18, 2015, Office Action.
U.S. Appl. No. 13/789,353, Apr. 23, 2015, Office Action.
U.S. Appl. No. 13/789,353, Jul. 13, 2015, Response to Office Action dated Apr. 23, 2015.
U.S. Appl. No. 13/789,353, Jul. 28, 2015, Final Office Action.
U.S. Appl. No. 13/789,353, Sep. 25, 2015, Response to Final Office Action dated Jul. 28, 2015.
U.S. Appl. No. 13/789,353, Oct. 16, 2015, Advisory Action.
U.S. Appl. No. 13/789,353, Oct. 27, 2015 Response to Advisory Action and Final Office Action dated Oct. 16, 2015.
U.S. Appl. No. 13/789,353, Jul. 7, 2016, Office Action.
U.S. Appl. No. 13/789,353, Oct. 7, 2016, Response to Office Action dated Jul. 7, 2016.
U.S. Appl. No. 14/231,510, Mar. 24, 2016, Office Action.
U.S. Appl. No. 14/231,510, Aug. 22, 2016, Response to Office Action dated Mar. 24, 2016.
U.S. Appl. No. 15/016,659, May 25, 2016, Notice of Allowance.
Extended European Search Report for European Application No. 18157702.4 dated Jun. 18, 2018.
EP 18157702.4, Jun. 18, 2018, Extended European Search Report.

\* cited by examiner

REDUCING NETWORK LATENCY

PRIORITY APPLICATION

The present application is a continuation of and claims the benefit under 35 U.S.C. § 120 of U.S. patent application Ser. No. 15/879,909, entitled "REDUCING NETWORK LATENCY," filed Jan. 25, 2018, which is a continuation of and claims the benefit under 35 U.S.C. § 120 of U.S. patent application Ser. No. 15/253,822, entitled "REDUCING NETWORK LATENCY," filed Aug. 31, 2016, now U.S. Pat. No. 10,021,223, which is a continuation of and claims the benefit under 35 U.S.C. § 120 of U.S. patent application Ser. No. 15/016,659, entitled "REDUCING NETWORK LATENCY," filed on Feb. 5, 2016, now U.S. Pat. No. 9,456,060, which is a continuation of U.S. patent application Ser. No. 13/283,420, entitled "REDUCING NETWORK LATENCY," filed Oct. 27, 2011, now U.S. Pat. No. 9,258,390, which claims priority under 35 U.S.C. § 119 of U.S. Provisional Application Ser. No. 61/513,108, entitled "REDUCING NETWORK LATENCY," filed Jul. 29, 2011, each of which is incorporated herein by reference in its entirety.

BACKGROUND

This invention relates to low-latency methods for transmitting data at a data processing system.

It is generally desirable to minimise the latency associated with sending messages over a network between applications. This enables a receiving application to receive a message the minimum possible time after the sending application forms the message.

It is especially important to minimise the latency over networks that connect high performance computing devices, or computing devices that must react as quickly as possible to incoming data in order to gain a commercial advantage, such as electronic trading devices. In electronic markets, messages sent over networks are used to submit orders and quotes to exchanges and it is often of considerable benefit for a computing system to be able to respond to external stimuli and submit orders and quotes ahead of competitors.

Applications running at computing devices on a network typically communicate over the network using an application-level protocol (such as HTTP or the Financial Information Exchange or FIX protocol) that define a series of structured messages. In order to form each message, the data for transmission must be processed in accordance with the application-level protocol (as well as lower layer protocols, such as Ethernet) in order to form a completed message that is ready for transmission over the network. Typically this protocol processing takes the form of generating headers and calculating error checks (such as CRCs). Such protocol processing can introduce significant latency into the transmission of data since in conventional data transmission systems a network protocol stack must wait for all of the data that is to form a message to be available before commencing protocol processing. This can significantly extend the time elapsed between an application determining that a message is to be sent and that message actually being transmitted onto the wire.

Other causes of transmission latency in conventional systems include the restriction for connection-oriented protocols (such as TCP) that only the protocol stack that negotiated the connection can transmit over the connection. Often such a protocol stack is supported at a host kernel, which does not present a low latency transmission path to applications of the system. Additionally, a modern processor can introduce significant latency if the state and instructions required by a transmission process is not available in cache at the processor.

There is therefore a need for improved methods for transmitting data at a data processing system that reduce the latency associated with message transmission.

SUMMARY

Roughly described, according to a first aspect of the first invention there is provided a method of transmitting data for use at a data processing system supporting an application, a software interface and a network protocol stack, the data processing system being coupled to a network by a network interface device, the method comprising: the application: forming one or more parts of a message for transmission; causing a message template to be generated by means of a first request to the software interface; the software interface: on receiving the first request, causing the network protocol stack to include said one or more parts of the message for transmission in the message template and, in accordance with a predetermined set of protocols, form at least in part one or more protocol headers for the message for transmission; and subsequently: forming one or more further parts of the message for transmission; causing the network protocol stack to include the one or more further parts of the message in the message template and, on completion of the message for transmission, process the message in accordance with the predetermined set of protocols so as to complete the protocol headers; and causing the network interface device to transmit the completed message over the network.

Suitably the step of forming one or more further parts of the message for transmission is performed by the application and the step of causing the network protocol stack to include the one or more further parts of the message in the message template is effected by means of a second request made by the application to the software interface. Suitably the application makes a series of second requests to the software interface, each second request being made on one or more further parts of the message for transmission becoming available to the application. The final request of the second request type in the series preferably completes the message for transmission, causing the network protocol stack to process the message in accordance with the predetermined set of protocols so as to complete the protocol headers and the network protocol stack to transmit the completed message.

Preferably the network protocol stack comprises at least two parts: a first part supported at the data processing system and a second part supported at the network interface device; the first part being configured to perform the step of forming at least in part one or more protocol headers of the message for transmission, and the second part being configured to perform the step of processing the message so as to complete the protocol headers. Preferably the step of forming the one or more further parts of the message for transmission is performed at a data processing engine of the network interface device. Preferably the step of causing the second part of the network protocol stack to process the message so as to complete the protocol headers is performed in response to completing formation of the one or more further parts of the message for transmission.

Preferably the first part of the network protocol stack is a user-level protocol stack.

Suitably at least part of the message template is held at the network interface device.

Preferably the first request includes memory references to the one or more parts of a message for transmission.

The method suitably further comprises, subsequent to the network protocol stack including said one or more parts of the message for transmission in the message template, the network protocol stack performing segmentation of the message template in accordance with a predetermined transport protocol such that the one or more parts of the message are transmitted over the network in one or more message segments by the network interface device. The method suitably further comprises, subsequent to the network protocol stack including said one or more further parts of the message for transmission in the message template, the network protocol stack causing those segments of the message template that correspond to the further parts of the message for transmission to be transmitted over the network by the network interface device. Preferably the step of the network protocol stack causing those segments of the message template that correspond to the further parts of the message for transmission to be transmitted over the network completes the step of the network interface device transmitting the message over the network.

The predetermined transport protocol could be the transmission control protocol.

Suitably the transport protocol is configured such that a message segment can carry a plurality of parts of the message for transmission that are not contiguous in the message for transmission. Suitably a message segment can include one or more header fields that determine the logical position within the message for transmission of the parts of the message in the message segment. Suitably the one or more header fields are formed in a TCP header option. Preferably all of the one or more parts of the message are transmitted over the network in a single message segment by the network interface device.

Suitably at least part of the message template is stored at the network interface device, that part of the message template stored at the network interface device including the one or more parts of a message for transmission.

Preferably the step of the network protocol stack including the one or more further parts of the message in the message template comprises transferring the one or more further parts of the message into the message template using one or more programmed I/O instructions. Alternatively the step of the network protocol stack including the one or more further parts of the message in the message template comprises: for those further parts of the message that are below a predetermined length, transferring the one or more further parts of the message into the message template using one or more programmed I/O instructions; and for those further parts of the message that are above the predetermined length, transferring the one or more further parts of the message into the message template by means of direct memory access by the network interface device.

Preferably the software interface is configured to provide a dummy transmission function by means of which an application can cause the network protocol stack to process the message template in accordance with the predetermined set of protocols as if for transmission by the network interface device, the method further comprising, prior to the step of the network interface device transmitting the message over the network, the application periodically calling the dummy transmission function so as to cause the network protocol stack to process the message template in accordance with the predetermined set of protocols without causing the network interface device to transmit the processed message template over the network.

Suitably the step of calling the dummy transmission function comprises, prior to the network protocol stack processing the message template in accordance with the predetermined set of protocols, the network protocol stack padding the message template with data so as to fill the missing parts of the message for transmission.

The message template could be a logical expression of the message for transmission.

Preferably the software interface is an application programming interface.

Preferably at least part of the network protocol stack is at user level.

According to a second aspect of the first invention there is provided a data processing system coupled to a network by a network interface device and comprising: an application configured to form one or more parts of a message for transmission; a network protocol stack configured to process messages for transmission in accordance with a predetermined set of network protocols; a software interface configured to, in response to a first request, cause the network protocol stack to form at least in part one or more protocol headers of a message for transmission; wherein the application is configured to, on forming one or more parts of a message for transmission, make a first request to the software interface so as to cause the network protocol stack to form a message template comprising at least in part one or more protocol headers of a message for transmission and the one or more parts of the message for transmission; and subsequently: the network protocol stack being configured to, on one or more further parts of the message for transmission being formed, include the one or more further parts of the message in the message template and, on completion of the message for transmission, process the message in accordance with the predetermined set of protocols so as to complete the protocol headers and cause the network interface device to transmit the completed message over the network.

Suitably the application is configured to form the one or more further parts of the message for transmission and to cause the network protocol stack to include the one or more further parts of the message in the message template by means of a second request to the software interface.

Preferably the one or more further parts of the message for transmission are formed at the network interface device at a data processing engine of the network interface, and the network protocol stack comprises at least two parts: a first part supported at the data processing system and a second part supported at the network interface device; the first part being configured to perform the step of forming at least in part one or more protocol headers of the message for transmission, and the second part being configured to perform the step of processing the message so as to complete the protocol headers.

According to a third aspect of the first invention there is provided a method of transmitting data for use at a data processing system and network interface device, the data processing system being coupled to a network by the network interface device, the method comprising: forming a message template in accordance with a predetermined set of network protocols, the message template including at least in part one or more protocol headers; forming an application layer message in one or more parts; updating the message template with the parts of the application layer message; processing the message template in accordance with the predetermined set of network protocols so as to complete the protocol headers; and causing the network interface device to transmit the completed message over the network.

Preferably the step of forming a message template is performed at a network protocol stack supported at the data processing system. The step of forming an application layer message could be performed by one of an application supported at the data processing system, and a data processing engine of the network interface device or other peripheral device of the data processing system. Preferably the processing step is performed at a packet processing engine supported at the network interface device.

According to a fourth aspect of the first invention there is provided a data processing system coupled to a network, the data processing system comprising: a network protocol stack configured to, in accordance with a predetermined set of network protocols, form a message template including at least in part one or more protocol headers; and a message forming engine configured to form an application layer message in one or more parts and, on the formation of each of those parts, cause the respective part of the message to be applied to the message template; wherein the network protocol stack is further configured to, on the application layer message being completed, process the message template in accordance with the predetermined set of network protocols so as to complete the protocol headers and cause the completed message to be transmitted over the network.

Preferably the network protocol stack is supported at a network interface device arranged to couple the data processing system to the network. The message forming engine could be one or both of an application supported at the data processing system or a data processing engine at a network interface device arranged to couple the data processing system to the network.

According to a first aspect of the second invention there is provided a method of transmitting data in accordance with a connection-oriented network protocol, the method being for use at a data processing system coupled to a network and supporting first and second packet processing engines, the method comprising: initiating a connection at the first packet processing engine; the first packet processing engine passing first network protocol state to the second packet processing engine sufficient to permit the second packet processing engine to transmit a specified amount of data over the connection; forming application layer data for transmission; and the second packet processing engine performing packet processing of the application layer data in dependence on the first network protocol state so as to form one or more network messages and causing transmission of one or more network messages over the connection.

Preferably the data processing system is coupled to the network by a network interface device and the second packet processing engine is supported at the network interface device.

Preferably the step of forming application layer data for transmission is performed at a data processing engine of the network interface device. Alternatively the step of forming application layer data for transmission is performed at an application supported at the data processing system. Alternatively the step of forming application layer data for transmission is performed at a data processing engine supported at a peripheral device of the system.

Preferably the passing step is performed in response to a request made by the second packet processing engine.

The first network protocol state could be a message template including at least in part one or more protocol headers for a network message.

Preferably the first packet processing engine performs processing of network messages received over the connection. Preferably the first packet processing engine is a software network protocol stack supported at kernel or user level at the data processing system. Preferably the second packet processing engine is configured to perform packet processing of the application layer data using an FPGA, ASIC, dedicated hardware, or embedded software.

The method could further comprise, subsequent to the passing step, the first packet processing engine signaling to the second packet processing engine so as to cause the second packet processing engine to return control of the connection to the first packet processing engine. The method could further comprise, in response to the signaling, the second packet processing engine completing any pending transmission operations over the connection and passing second network protocol state to the first packet processing engine so as to return control of the connection to the first packet processing engine.

The method preferably further comprises, on the amount of data transmitted over the connection becoming within a predetermined amount of the specified amount of data, the second packet processing engine requesting updated network protocol state from the first packet processing engine and, in response to the request, the first packet processing engine passing updated network protocol state to the second packet processing engine. The method preferably further comprises: forming additional application layer data for transmission; and the second packet processing engine performing packet processing of the additional application layer data in dependence on the updated network protocol state so as to form one or more network messages and causing transmission of the one or more network messages over the connection.

Preferably the steps of forming the application layer data and performing packet processing comprise: forming one or more first parts of the application layer data; the second packet processing engine processing the one or more parts of the application layer data in dependence on the first network protocol state so as to form a message template including at least in part one or more protocol headers; and subsequently: forming one or more additional parts of the application layer data; and updating the message template with the one or more additional parts of the application layer data so as to complete the message template and processing the message template so as to complete the protocol headers.

Preferably the method further comprises, once the specified amount of data has been transmitted over the connection, the second packet processing engine returning control of the connection to the first packet processing engine.

Suitably the connection-oriented network protocol is TCP.

In any aspect of any of the inventions disclosed herein a data processing engine could be an FPGA, ASIC, dedicated hardware, or embedded software.

According to a second aspect of the second invention there is provided a data processing system coupled to a network, the data processing system comprising: a message forming engine operable to form application layer data for transmission over the network in accordance with a connection-oriented network protocol; a first packet processing engine operable to initiate a connection in accordance with the connection-oriented network protocol; a second packet processing engine operable to perform packet processing of application layer data so as to form one or more network messages in accordance with the connection-oriented network protocol; wherein the first packet processing engine is configured to, subsequent to initiating the connection, pass first network protocol state to the second packet processing engine sufficient to permit the second packet processing engine to transmit a specified amount of data over the connection, and the second packet processing engine is configured to, on receiving application layer data from the message forming engine, perform packet processing of the application layer data in dependence on the first network protocol state so as to form one or more network messages and cause transmission of one or more network messages over the connection.

According to a first aspect of a third invention there is provided a method for minimising execution latency of a communication process provided for execution at a data processing system, the data processing system being coupled to a network and supporting a software interface, an application and a network protocol stack providing a communication process, and the method comprising the application periodically making a call to a dummy communication function of the software interface so as to cause the network protocol stack to perform the communication process without communicating data over the network.

Preferably the software interface provides a communication function corresponding to the dummy communication function and the method further comprises the application subsequently making a call to the communication function in respect of a network message so as to cause the network protocol stack to perform the communication process and communicate the network message over the network. Suitably the dummy communication function and the corresponding communication function are one and the same, and the dummy communication function is identified by means of a flag of the communication function.

Suitably the communication process is a transmit process and the step of making a call to a communication function comprises the application periodically making a call to a dummy transmit function of the software interface so as to cause the network protocol stack to perform the transmit process without transmitting data over the network.

Suitably the dummy transmit function is called in respect of a partial message held at a transmit buffer of the data processing system.

Suitably the communication process is a receive process and the step of making a call to a communication function comprises the application periodically making a call to a dummy receive function of the software interface so as to cause the network protocol stack to perform the receive process of the network protocol stack without receiving data over the network.

DESCRIPTION OF THE DRAWINGS

The present invention will now be described by way of example with reference to the accompanying drawings, in which.

DETAILED DESCRIPTION

The following description is presented to enable any person skilled in the art to make and use the inventions, and is provided in the context of a particular application. Various modifications to the disclosed embodiments will be readily apparent to those skilled in the art.

The general principles defined herein may be applied to other embodiments and applications without departing from the spirit and scope of the present inventions. Thus, the present inventions are not intended to be limited to the embodiments shown, but is to be accorded the widest scope consistent with the principles and features disclosed herein.

The present inventions relate to the transmission of data over a network between data processing systems. A data processing system could be any kind of computing device, such as a server, personal computer or handheld device. The present inventions are described herein by way of example with reference to networks that operate TCP/IP over Ethernet, but it will be appreciated by the skilled person that the present invention is not so limited and could be implemented with any kind of network (wired or wireless) and set of network protocols. The present inventions are particularly suitable for use at a data processing system and network interface device (NIC) configured such that at least part of the protocol processing of data packets for transmission is performed at the NIC. Thus, at least some of the network protocol stack can be supported at the NIC, with one or more network protocols being offloaded in part or in full to the NIC to be performed in hardware at the NIC.

The present inventions address the latencies introduced in the transmission of data packets or messages over a network when the data for some parts of a network message are not immediately known to the entity that forms the application-layer message and requests the data transmission operation. Often, data that is to constitute some parts of a message are immediately known to an application on determining that a message is to be sent, whilst data for other parts of the message are not known until just before the message is transmitted over the network. In conventional transmission systems, the network stack waits for all of the data for the message to become available prior to performing protocol processing and transmitting the message.

The first of the inventions provides a mechanism by which a network message can be incrementally constructed by one or more network protocol stacks and one or more entities forming application layer data. This can be achieved through the provision of an interface by which an application supported at a data processing system can provide data for transmission to a network stack as and when the data becomes available, allowing the network stack to perform any possible protocol processing and minimising the latency caused by data that is available only at the last moment. The second of the inventions provides a mechanism by which a stream of a connection-oriented protocol can be handed between network protocol stacks. This allows a host to manage the protocol streams but permit another network protocol stack to perform at least some transmission operations at low latency. It is intended that the first and second inventions can be used together. Thus the first invention along with any of its optional features can be implemented with the second invention along with any of its optional features. The first and second inventions described below are therefore not mutually exclusive and disclosure is made of the combination of the first invention in any of its embodiments and the second invention in any of its embodiments.

Figure 1:
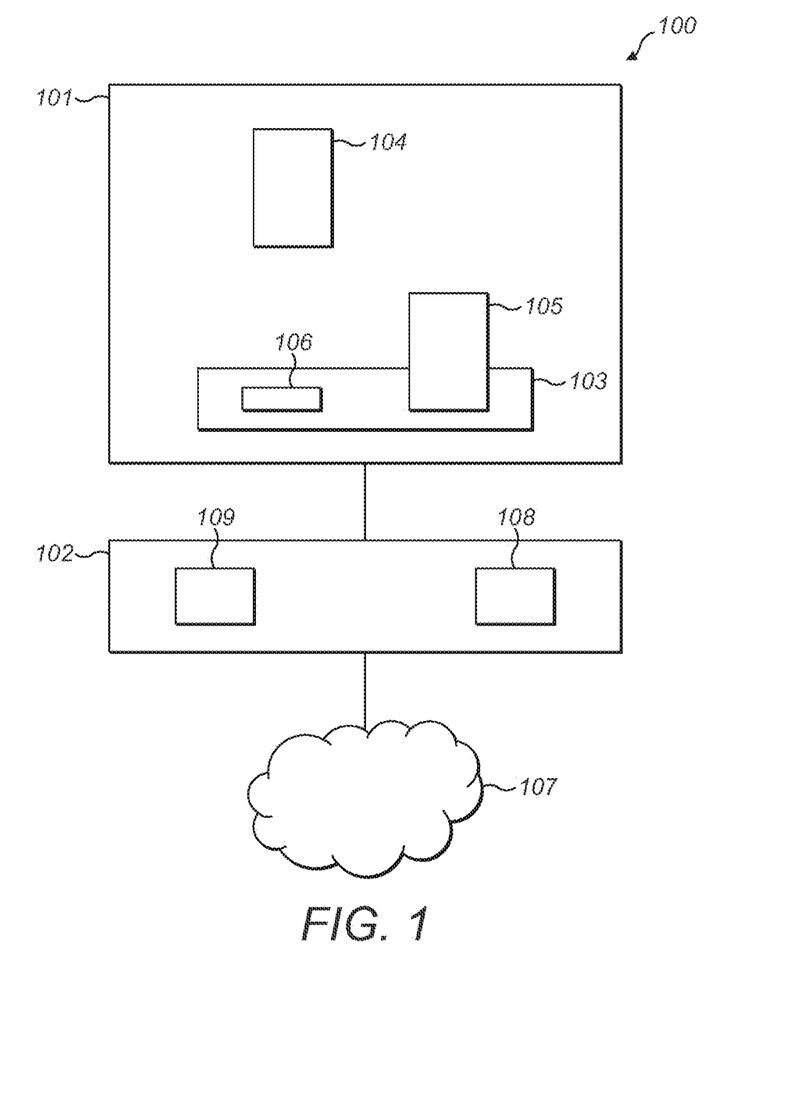
FIG. 1 is a schematic diagram of a data processing system and network interface device configured in accordance with the present invention.

A schematic diagram of a system 100 configured in accordance with the present inventions is shown in FIG. 1. Data processing system 101 supports an operating system 103 and an application 104 that is operable to communicate over network 107 by means of network interface device or NIC 102 and network protocol stack 105. The network protocol stack is illustrated as a logical block in the figure and all or part of the stack could be supported at kernel, user-level, or at the network interface device 102. All or part of the protocols of the network stack could be performed at a packet processing engine 108 of the network interface device itself. The network interface device could optionally also support a message generating entity 109 configured to generate application-layer network messages in an analogous manner to the way in which application 104 might form messages for transmission over the network. The network interface device could be supported at the data processing system; for example, it could be provided at the mainboard of the data processing system.

The first invention will now be described by way of example with reference to FIG. 1.

The first invention provides a mechanism by which a network message can be incrementally constructed by one or more network protocol stacks and one or more entities forming application layer data. On a request being made to transmit a network message (for example, by means of a call from an application to a socket API provided by the operating system), a network protocol stack of system 100 is configured to generate a message template for the network message in accordance with a predetermined set of network protocols such that the message template includes at least in part one or more protocol headers for the message. If, at the time the transmit request is made, any data for transmission is available from one or more entities of the system that are arranged to form application layer data, the network protocol stack also includes that data in the message template.

Thus, a message template that can include parts of the application-layer message for transmission is generated whilst the remainder of the message is formed. As further parts of the message become available, the message template can be updated with those parts of the message. Once all of the message is available, a network protocol stack of the system completes protocol processing of the data packet so as to complete its protocol headers and the packet is transmitted over the network by the network interface device. The message template is a logical construct that includes the known parts of the message and headers (and/or other data) generated by the protocol stack. The data defining a message template could be included by means of one or more memory references (e.g. to the known parts of the message). The message template could be contiguously defined in memory such as a transmit buffer.

Any of application 104, operating system 103, message generating entity 109 at the NIC, or a message generating entity at another peripheral device of system 100 could be an entity forming application layer data. Either the kernel or user-level network stack 105, or packet processing engine 108 at the NIC represent network protocol stacks. Sometimes it is advantageous for one entity forming application layer data to request transmission of a message and optionally provide some of the message data, and for another entity forming application layer data to complete the message. The first invention can be performed and a network data packet built up incrementally irrespective of where the protocol processing is performed and where the message data is formed.

Similarly, it can be advantageous for one network protocol stack to commence packet processing and for another network protocol stack to complete packet processing. For example, application 104 at the data processing system could request transmission of a network message and provide some of the data for that message before passing over to network generating entity 109 at the NIC, which generates the remainder of the message. The message template in this example be generated at a user level network stack 105 before passing control of the remainder of the processing of the network message to packet processing engine 108 at the NIC. This example ensures that the final parts of a message and the completion of protocol processing of the network message is performed with low latency at the NIC.

According to a preferred embodiment of the first invention, a software interface 106 is provided by means of which application 104 at the host data processing system can request that data for transmission is formed into a message by network stack 105 and transmitted over network 107 by means of NIC 102. Preferably, software interface 106 is an application programming interface or API.

Figure 2:
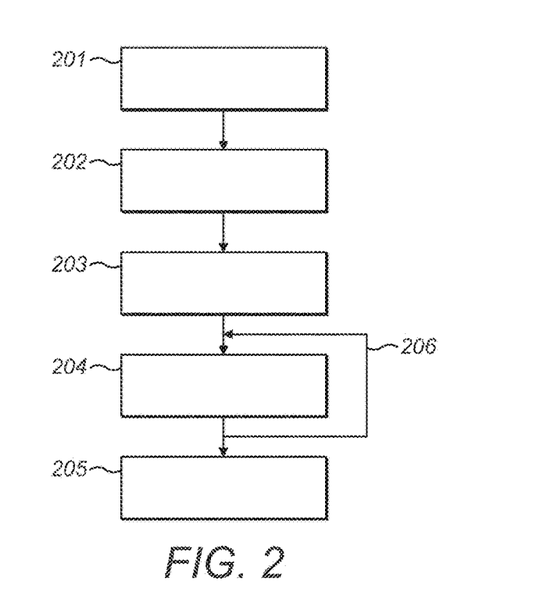
FIG. 2 is a flow chart illustrating data transmission in accordance with the present invention.

A flow chart illustrating data transmission in accordance with the present invention is shown in FIG. 2. On determining that data is to be sent over a network to a remote endpoint, at step 201 application 104 forms those parts of the message that are known to the application and at step 202 requests by means of software interface 106 that a message template is created. The application passes a reference to the data constituting the known parts of the message in its request 202, typically a memory reference to the location of the those message parts in an application buffer. In response to the request the software interface causes network protocol stack 105 to create a message template at step 203 including those known parts of the message that were formed by the application at step 201.

Preferably the network stack populates the message template with data by copying the data known to the application from the application's buffers to the transmit buffer holding the message template, with the data being written to the template at the position that data is to have in the completed message. Alternatively, references to the known application data are included in the message template so as to allow the full message to be logically read from the transmit buffer when the message is completed. The message template represents the completed message once it includes all data for transmission from the application and all protocol processing has been completed by the protocol stack (e.g. to form the appropriate headers for the message). Protocol processing may be performed in software at the data processing system, or in hardware at the network interface device. Typically some protocols are completed on-the-fly by the network interface device as the message traverses the NIC—for example, the calculation of CRC check data for Ethernet data packets. A completed message is transmitted over the network at step 205.

Software interface 106 is configured so as to provide a mechanism by which an application can provide further parts of the message to the network stack as they become known to the application. This is shown by message update step 204 in FIG. 2, which comprises the application making a request to the software interface by means of which it passes one or more references to the data that is to be included as further parts of the message. In response to the message update request, software interface 106 causes the network protocol stack to include the newly-available data into the message template. Message update step 204 can be performed as many times as is necessary to complete the message template, as indicated by return arrow 206.

Figure 3:
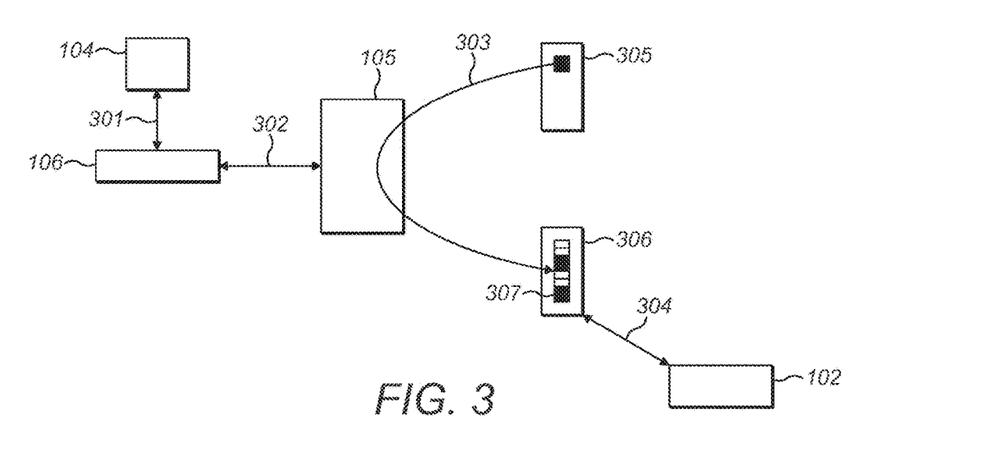
FIG. 3 shows a general overview of the interaction of the various components of FIG. 1.

A general overview of the interaction of the various components of FIG. 1 is shown in FIG. 3. Application 104 is configured to access software interface 106 by means of a set of commands or requests 301. Preferably software interface 106 is an application programming interface (API) with requests 301 being calls to the API. As indicated by arrow 302, the software interface is configured to cause network protocol stack 105 to include data held at the application buffer(s) 305 of application 104 into message template 307 held in transmit buffer 306. Arrow 303 indicates the transfer of data or references to data from the application buffers into the message template.

Additionally, network stack 105 is configured to perform on the data of the message template the appropriate possible protocol processing, such as the formation of protocol headers and footers. For example, even when none or only some of the data of the message is known, for many protocols it is possible to form the source and destination addresses and specify certain header options, such as packet length and sequence number. Performing this processing whilst the application is waiting for some of the packet data to become available minimises the latency associated with transmitting the message since the amount of protocol processing to be performed once all of the message data is known is reduced and hence the time between the last of the message data being available and the point at which the message is actually transmitted is reduced.

Often most of the payload data of a data packet will be available to an application, but some parts of the payload data will only be available immediately prior to the transmission of the data packet over a network. This is typically because the application is performing calculations to determine those parts of the message data. For example, in the case in which the application is an electronic trading application, the application might only determine the price, quantity or symbol for a trade at the last moment before an electronic trading message is sent. However, it is vitally important that the latency of the trade is as small as possible and the present invention achieves this by arranging that as much of the protocol processing of the data packet as possible is performed prior to the final parts of the message being available.

The message template may be held in transmit buffers at the data processing system or at the NIC, or the logical message template could be held in part in memory at the data processing system and in part at memory at the NIC. If the message template 307 is held at the data processing system, the network interface device 102 is preferably configured to have direct memory access (DMA) to transmit buffer(s) 306 and hence reads completed messages from the transmit buffers of the data processing system by means of DMA (indicated by arrow 304 in FIG. 3). If the message template 307 is held in transmit buffer(s) 306 at the NIC, the NIC 102 can access (arrow 304) the message template directly. Arranging that the message template is held at the NIC, with at least some further protocol processing being performed at the NIC can help to further minimise the latency of transmission operations.

Note that network protocol stack 105 is illustrated in the figures as a single entity but may in fact comprise one or more software entities that could be located at kernel or user level at the data processing system. The stack 105 could be a user-level protocol stack configured to perform protocol processing in the context of user-level software so as to minimise context switches into the kernel. Further parts of the total network protocol stack could be performed at the network interface device 102. For example, in the case of a network interface device that supports TCP offload, the majority of TCP protocol processing would be performed at the network interface device.

Protocol processing could be performed at NIC 102 at a packet processing engine 109, which could be, for example, an FPGA, ASIC, embedded software or a hardware protocol processing engine configured to perform dedicated processing according to one or more network protocols. In certain configurations, it can be advantageous for a data processing system and NIC to support multiple entities capable of performing protocol processing. For example, a data processing system might support both kernel and user-level protocol stacks, and at least part of a stack supported at the data processing system could also be supported at the NIC. The data processing system would typically be configured to select the appropriate stack in dependence on the message type, network conditions, or other factors.

Preferably, the initial protocol processing associated with forming the message template at step 203 is performed in software at the data processing system and subsequent protocol processing associated with message update step 204 is performed at NIC 102. This can have significant advantages when the missing parts of the message for transmission are provided as a result of processing performed at the NIC.

For example, consider the situation in which data processing system 101 and NIC 102 form an electronic trading platform whose operation will now be described with respect to the figures. At step 201, the electronic trading software determines that a trade is to be placed at an electronic exchange accessible over network 107 and forms data for transmission in a bid message to the electronic exchange. At step 202, the trading software requests by means of interface 106 that a message template be created and that protocol processing is initiated at a software protocol stack of the data processing system. In response, interface 106 causes the software protocol stack to commence processing of the message and generate the message template in a buffer memory at the NIC.

In the present example, most of the data for transmission is known to the application at the point at which creation of the message template is requested, with the missing parts of the message being determined at the NIC by means of trading algorithms running at the NIC at a message forming entity 108—such as at a dedicated FPGA or ASIC, or by means of software running at a processor supported at the NIC. This allows the software protocol stack to substantially form the message template, leaving the NIC to add the results of its processing and complete the headers immediately prior to transmitting the message over the network from its buffer to the electronic exchange. By locating the final processing of the message as close as possible to the network at the NIC, latency is minimised.

Under the control of the trading software 104, the trading algorithms running at the NIC determine the data for the missing parts of the message template whilst the protocol processing of step 203 is performed. As soon as the parameters of the trade that represent the final parts of the message have been determined by the algorithms, the missing parts of the message are at step 204 included in the message template by the NIC and the network protocol stack at the NIC (packet processing engine 109) completes protocol processing of the data packet before at step 205 transmitting the message over the network to the electronic exchange. Preferably the processes running at the NIC cause the network protocol stack to complete protocol processing of the message. Preferably the processes are executed at one or more FPGA processors of the NIC, the one or more processors optionally including a memory at which the message template is stored.

Typically the trade message would be formed in accordance with the FIX application layer protocol over TCP/IP and Ethernet, with the trading software forming a message in accordance with the FIX protocol and the lower layer protocol stacks being generated at the software stack (which could be at user level) of the data processing system. This would leave the NIC to complete the payload data and message headers in accordance with the appropriate protocols once the trading algorithms at the NIC determine the parameters of the bid (e.g. number of stocks, stock symbol, etc.).

Three transmission mechanisms for use in accordance with the first invention will now be described.

A first transmission mechanism can be used with messaging protocols that support segmentation, such as the Transmission Control Protocol (TCP) which will now be discussed by way of example. TCP includes a segmentation algorithm that allows a stream of messages to be split into multiple segments, each of which includes a sequence number so that the receiver can reassemble the message stream even when segments arrive out of order. In this embodiment, the network protocol stack is configured to cause the network interface device to transmit at least some of the known parts of a message prior to the message template being completed. This is achieved by configuring the network protocol stack to send the known parts of a message template as TCP segments, with subsequent parts of the message being transmitted as further TCP segments as they become known.

For example, for a message of total length 30 bytes, with 2 bytes initially unknown at offset 10 bytes, the following TCP segments would be initially transmitted:

tcp-seq-1: seq=0, len=10
tcp-seg-2: seq=2, len=18

On receiving these segments, the receiving data processing system can deliver the first 10 bytes of the message to the receiving application but not any more since it does not yet have the data at sequence position 10. Later, when the missing 2 bytes are known, the following TCP segment would be transmitted:

tcp-seg-3: seq=10, len=2

The receiving data processing system can then deliver the remaining 20 bytes of the message to the receiving application.

The protocol processing stack is configured to perform segmentation of the incomplete message template by forming each contiguous known part of the message into a message segment and passing the segment to the network interface device for transmission. The protocol processing stack could be configured to only form a message segment for contiguous parts of the message that exceed a predetermined length so as to avoid the overhead associated with sending many small data packets. Note that the message template and message segment(s) need not be a contiguously stored at a transmit buffer and could be logically represented at a transmit buffer such that it is not necessary to duplicate known parts of the message data in memory one or both of the message template and a message segment could refer to the location of the message data held in the transmit buffer.

This embodiment is of particular benefit if the known parts of the message are large and the updates are small, since the latency critical step of forming and sending the last parts of the segmented message involves sending one (or sometimes a small number of) small message segment(s).

However, there are problems with using the TCP protocol in this manner: Each TCP segment can only contain a subset of the message that is contiguous in the sequence space of the message stream. Hence in the above example, two segments were needed to transfer only 28 bytes, which is highly inefficient. This is particularly a problem if a message template is completed by multiple discrete message parts that require multiple message segments to be transmitted in order to complete the transfer of the message data to the receiving data processing system because the formation and transmission of the last message segments is critical to the overall latency of the message transmission operation.

The technique can only be used if the size of the unknown segments of data are known in advance because it is necessary to know where each message part is located in the sequence space.

The receiving TCP implementation receives the arriving updates out of order and therefore will respond to such message segments with an ACK message. This can increase the latency of message reception.

In a second transmission mechanism it is therefore proposed that the TCP protocol is extended or replaced with a new transport protocol that allows multiple message segments to be delivered in a single multi-segment network message. This can be achieved by defining in the protocol a multi-segment message format arranged to carry multiple segments of a message as a contiguous data payload and header fields that specify the how the contiguous data payload should be split up into its constituent message segments at the receiving data processing system. For example, by specifying in header fields the byte offset within the parent message and length of each message segment in the payload, the message segments can be extracted from the payload of the multi-segment message and reassembled to form the parent message. The message segments forming the payload of the multi-segment message could be separated by markers delineating the message segments; these markers could be headers carrying the byte offset and optionally length information of the respective segment in the parent message.

The TCP protocol can be extended to support multiple message segments in each TCP segment by defining a new TCP header option type to describe the layout of the message segments.

For small messages, the cost of segmentation and reassembly in order to transfer known parts of a message in advance can outweigh the benefits. A third transmission mechanism proposes an alternative strategy in which known parts of a message are transferred to buffers at a network interface device in advance of those parts of a message not yet available to an application. In this embodiment, transmit buffer 306 is located in memory at the network interface device such that the message template is formed at a network interface device buffer and data for transmission is copied into the message template at the NIC in accordance with steps 203 and 204 of FIG. 2. This ensures that as much data as possible is held as close as possible to the NIC at the point when the last of the message data becomes available.

Message data constituting the parts of the message to be held in the message template can be transferred to the NIC 102 using programmed I/O (PIO) instructions or direct memory access (DMA) by the NIC to buffers held at the data processing system (these buffers could include application buffer 305, or be an intermediate buffer supported by the network protocol stack). Preferably message update step 204 in FIG. 2 is performed using PIO instructions to transfer newly-available message parts into the message template, with the host CPU of the data processing system performing the transfer. This has lower latency than DMA when small amounts of data are transferred. The initial transfer of data at step 203 from the application buffer to the transmit buffer can be performed by DMA.

Most preferably, the decision as to whether to perform message update step 204 by PIO or DMA transfer is made dynamically in dependence on the size of the message part being transferred, with messages below a predetermined threshold size being transmitted using PIO and messages above that threshold being transmitted using DMA.

The second of the inventions will now be described, which provides a mechanism by which a stream of a connection-oriented protocol can be handed between network protocol stacks.

In general it is not possible for more than one stack to transmit messages over a given connection of a connection-oriented network protocol such as TCP. In order to maintain the order of messages over a connection under varying network conditions, the state information (such as sequence number and receive window parameters) associated with that connection is required and that state information resides with the protocol stack that established the connection.

This invention provides a mechanism by which one network stack can hand over the ability to transmit over a connection to another network stack for a limited period. This will be illustrated by way of example with reference to the system 100 of FIG. 1. Consider a first packet processing engine (network stack 105 at data processing system 101) that has established a TCP connection over network 107 and a second packet processing engine (network stack 109 at network interface device 102) that wishes to transmit over that connection. In accordance with the invention, network stack 105 passes network protocol state to the NIC network stack 109 that is sufficient to allow the second packet processing engine to transmit a specified amount of data over the connection. This state can include one or more sequence numbers, congestion window and/or receive window parameters, network addresses and port numbers. By transmitting this state to network stack 109, network stack 105 passes permission to the network stack 109 to transmit data over the network.

Typically the state includes at least the current sequence number and a parameter identifying the receive window remaining. This allows network stack 109 to start transmitting data packets over the connection until the remaining receive window is used up, at which point network stack 109 returns control to the parent network stack 105. Note that the connection state itself need not be copied between the network stacks and the passing of connection state to network stack 109 could be achieved by passing one or more memory references to the state or a copy of the state held in memory at the data processing system.

Most generally, this invention provides a mechanism by which one network stack can hand over the ability to transmit over a connection to another network stack irrespective of the locations of those network stacks: either one could be at the kernel of operating system 103, supported at user level of the data processing system, at packet processing engine 108 of NIC 102, or at another peripheral device of the system.

Application layer data for transmission over the connection could be formed at any point in system 100: at the kernel of operating system 103, at application 104, at message forming entity 109 of NIC 102, or at another peripheral device of the system. Application layer data for transmission over the connection by means of the slave network stack (e.g. 109 in the above example) is provided to the slave network stack and the slave network stack is configured to process the application layer message in dependence on the received state so as to prepare the message for transmission over the connection by the NIC.

The second invention is particularly advantageous if the message forming entity is close to the slave network stack so as to minimise the latency between the application layer message being formed and the resulting data packet being sent over the connection. Most preferably, the slave network stack is packet processing engine 108 and the message forming entity 109 is located at the NIC. This arrangement is particularly effective at minimising the latency of transmission because the formation of application layer messages and the processing of those messages into data packets for transmission over the connection is performed as close as possible at the NIC that effects the transmission of the data packets over the wire. Furthermore, this mechanism can avoid implementing the entirety of the connection-oriented protocol in hardware at a NIC, which would be very complex and requires significant processing and memory resources at the NIC.

Preferably the parent network stack maintains control of the receive path of the connection.

Once the slave network stack has transmitted its allowance of data over the connection, the slave stack returns control to the parent stack and optionally requests permission to transmit additional data over the connection. Alternatively, such permission could be requested on behalf of the slave stack—for example, by an application 104 at the data processing system. It is also preferable if the parent stack can direct the slave stack to return control to the parent stack at any moment so as to allow the parent stack to perform its own transmission operations—for example, to transmit messages required to maintain the connection.

To give a particular example, data processing system 101 might support an electronic trading application 104 that is configured to make use of a set of trading algorithms arranged to execute at an FPGA 109 of NIC 102. On identifying that a set of trades are to be made, application 104 can request that user-level network stack 105 permit packet processing engine 108 to transmit a specified amount of data over a TCP connection established by network stack 105 to an electronic exchange. The application could make such a request by means of software interface 106 described in relation to the first invention. FPGA 109 at the NIC can then operate autonomously, receiving data over network 107 from an electronic exchange and forming application layer bid and quote messages in response in accordance with its trading algorithms. Since packet processing engine 109 has permission and the necessary state to transmit over the TCP connection to the electronic exchange, the packet processing engine can process the application layer messages at the NIC and transmit the resulting data packets over the wire at very low latency.

The second invention and first invention can be utilised together with the slave network stack being configured to complete message templates generated by the parent network stack. In fact, the network protocol state passed from the parent stack to slave stack can be a set of one or more message templates generated by the parent network stack. Thus, the parent network stack can prepare a set of message templates which are passed to the slave stack for completion with application layer data and processing in accordance with the connection oriented protocol. The slave network stack can alternatively be configured to form message templates at the NIC in dependence on the state received from the parent network stack, though the slave network stack need not itself be supported at the NIC. The message templates could be stored in memory at the NIC, or at a memory of a message forming entity supported at the NIC (e.g. at a memory of an FPGA configured to from the application layer data).

In any of the embodiments of the present invention described herein it is advantageous to configure software interface 106 to provide a "dummy" transmission function that causes the appropriate CPU core of the data processing system to execute a transmit code path without actually causing any data to be transmitted over the network. This has the effect of ensuring that the instructions and state required to execute the code path are resident in the cache of the appropriate CPU core of the data processing system. This is advantageous because the time taken to execute a particular code path is generally highly dependent on whether the instructions that define the code path, and the state touched by the code path, are resident in the cache of the CPU core executing that code path. If the instructions and state are not resident in the cache, the code path typically executes much more slowly.

A dummy transmission function is provided that can be called by a software interface so as to cause the appropriate CPU core to, from its point of view, perform a transmission operation on the message template stored at the transmit buffer. In other words, the software interface causes the network protocol stack to process the message template in preparation for transmission by the NIC as though the message template were complete. However, the message template is not actually transmitted by the NIC and is preferably not passed to the NIC at all, by PIO or by DMA transfer. The missing portions of the message could be padded with values so as to form a "complete" message that can be processed by the stack.

More broadly, a software interface can be configured to provide a dummy transmit function and/or a dummy receive function configured to cause the appropriate CPU core to perform a transmission or receive operation (as appropriate) without actually transmitting or receiving any data at the data processing system. Such a software interface need not be operable to form a message template as described above in relation to FIGS. 1 to 3. A dummy transmit function is configured to cause execution of the transmit code path of the appropriate network protocol stack so as to bring the state required by the transmit code path of the network protocol stack into the cache of the processor that would perform the respective actual transmit operations. A dummy receive function is configured to cause execution of the receive code path of the appropriate network protocol stack so as to bring the state required by the receive code path of the network protocol stack into the cache of the processor that would perform the respective actual receive operations. These dummy functions have the effect of ensuring that the instructions and state required to execute the code path are resident in the cache of the appropriate CPU core of the data processing system.

Preferably the dummy transmit or receive functions are called by means of regular transmit or receive functions (such as send( ) or recv( ) TCP socket calls) carrying a predetermined flag that indicates to the software interface that the transmit/receive function is a dummy function. This ensures that calls to the dummy transmit/receive functions use the same entry point as regular transmit/receive function calls. No payload data need be provided with calls to a dummy transmit function, and no payload data need be returned in response to a dummy receive function. The software interface is preferably a socket API.

Preferably an application is configured to periodically invoke a dummy transmit and/or receive function of the software interface so as to increase the likelihood that the appropriate instructions and state are in the cache when required by genuine transmit or receive operations.

By providing dummy transmit/receive functions, the software interface allows an application to prepare the cache of a CPU and ensure that latency of the transmit/receive code paths is minimised.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

We claim:

1. A method of transmitting data in accordance with a connection-oriented network protocol, the method being for use at a data processing system adapted to be coupled to a network and comprising first and second packet processing engines, the method comprising:
   initiating a connection at the first packet processing engine;
   the first packet processing engine passing first network protocol state to the second packet processing engine sufficient to permit the second packet processing engine to transmit a specified amount of data over the connection;
   forming application layer data for transmission;
   the second packet processing engine performing packet processing of the application layer data in dependence on the first network protocol state so as to form one or more network messages and causing transmission of one or more network messages over the connection.

2. A method of transmitting data as claimed in claim 1, wherein the data processing system is adapted to be coupled to the network by a network interface device and the second packet processing engine is supported at the network interface device.

3. A method of transmitting data as claimed in claim 1, wherein the step of forming application layer data for transmission is performed at at least one of:
   a data processing engine of the network interface device;
   an application supported at the data processing system; and
   a data processing engine supported at a peripheral device of the system.

4. A method of transmitting data as claimed in claim 1, wherein the passing step is performed in response to a request made by the second packet processing engine.

5. A method of transmitting data as claimed in claim 1, wherein the first network protocol state is a message template including at least in part one or more protocol headers for a network message.

6. A method of transmitting data as claimed in claim 1, wherein the first packet processing engine performs processing of network messages received over the connection.

7. A method of transmitting data as claimed in claim 1, wherein the first packet processing engine is a software network protocol stack supported at kernel or user level at the data processing system.

8. A method of transmitting data as claimed in claim 1, wherein the second packet processing engine is configured to perform packet processing of the application layer data using an FPGA, ASIC, dedicated hardware, or embedded software.

9. A method of transmitting data as claimed in claim 1, further comprising, subsequent to the passing step, the first packet processing engine signalling to the second packet processing engine so as to cause the second packet processing engine to return control of the connection to the first packet processing engine.

10. A method of transmitting data as claimed in claim 9, further comprising, in response to the signalling, the second packet processing engine completing any pending transmission operations over the connection and passing second network protocol state to the first packet processing engine so as to return control of the connection to the first packet processing engine.

11. A method of transmitting data as claimed in claim 1, further comprising, on the amount of data transmitted over the connection becoming within a predetermined amount of the specified amount of data, the second packet processing engine requesting updated network protocol state from the first packet processing engine and, in response to the request, the first packet processing engine passing updated network protocol state to the second packet processing engine.

12. A method of transmitting data as claimed in claim 11, further comprising:
   forming additional application layer data for transmission; and
   the second packet processing engine performing packet processing of the additional application layer data in dependence on the updated network protocol state so as to form one or more network messages and causing transmission of the one or more network messages over the connection.

13. A method of transmitting data as claimed in claim 1, wherein the steps of forming the application layer data and performing packet processing comprise:
   forming one or more first parts of the application layer data;
   the second packet processing engine processing the one or more parts of the application layer data in dependence on the first network protocol state so as to form a message template including at least in part one or more protocol headers;
and subsequently:
   forming one or more additional parts of the application layer data; and
   updating the message template with the one or more additional parts of the application layer data so as to complete the message template and processing the message template so as to complete the protocol headers.

14. A method of transmitting data as claimed in claim 1, further comprising, once the specified amount of data has been transmitted over the connection, the second packet processing engine returning control of the connection to the first packet processing engine.

15. A method of transmitting data as claimed in claim 1, wherein the first network protocol state comprises at least one of: one or more sequence numbers; one or more congestion window parameters; one or more receive window parameters; one or more network addresses; and one or more port numbers.

16. A method of transmitting data as claimed in claim 1, comprising:
   the second packet processing engine transmitting data packets over the connection until a receive window is used up;
   in response to the receive window being used up, the second packet processing engine returning control of the connection to the first packet processing engine.

17. A data processing system adapted to be coupled to a network, the data processing system comprising:
   a message forming engine operable to form application layer data for transmission over the network in accordance with a connection-oriented network protocol;
   a first packet processing engine operable to initiate a connection in accordance with the connection-oriented network protocol; and
   a second packet processing engine operable to perform packet processing of application layer data so as to form one or more network messages in accordance with the connection-oriented network protocol;
   wherein the first packet processing engine is configured to, subsequent to initiating the connection, pass first network protocol state to the second packet processing engine sufficient to permit the second packet processing engine to transmit a specified amount of data over the connection, and the second packet processing engine is configured to, on receiving application layer data from the message forming engine, perform packet processing of the application layer data in dependence on the first network protocol state so as to form one or more network messages and cause transmission of one or more network messages over the connection.

* * * * *